US012647618B2

(12) United States Patent
Gao et al.

(10) Patent No.: US 12,647,618 B2
(45) Date of Patent: Jun. 2, 2026

(54) METHODS AND DEVICES FOR GEOMETRIC PARTITIONING MODE WITH ADAPTIVE BLENDING

(71) Applicant: BEIJING DAJIA INTERNET INFORMATION TECHNOLOGY CO., LTD., Beijing (CN)

(72) Inventors: Han Gao, San Diego, CA (US); Xiaoyu Xiu, San Diego, CA (US); Yi-Wen Chen, San Diego, CA (US); Wei Chen, San Diego, CA (US); Hong-Jheng Jhu, San Diego, CA (US); Ning Yan, San Diego, CA (US); Che-Wei Kuo, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/801,713

(22) Filed: Aug. 12, 2024

(65) Prior Publication Data

US 2025/0039457 A1 Jan. 30, 2025

Related U.S. Application Data

(63) Continuation of application No. PCT/US2023/013063, filed on Feb. 14, 2023.

(Continued)

(51) Int. Cl.
H04N 19/66 (2014.01)
H04N 19/119 (2014.01)
(Continued)

(52) U.S. Cl.
CPC ........... H04N 19/66 (2014.11); H04N 19/119 (2014.11); H04N 19/174 (2014.11); H04N 19/70 (2014.11)

(58) Field of Classification Search
CPC ...................................................... H04N 19/66
See application file for complete search history.

(56) References Cited

U.S. PATENT DOCUMENTS

2017/0353733 A1 12/2017 Mukherjee et al.
2021/0029366 A1* 1/2021 Zhang .................. H04N 19/109
(Continued)

FOREIGN PATENT DOCUMENTS

WO 2020253822 A1 12/2020
WO 2021037053 A1 3/2021
(Continued)

OTHER PUBLICATIONS

International Search Report issued in PCT Application No. PCT/US2023/013063 dated May 26, 2023, (4p).
(Continued)

*Primary Examiner* — Jerry T Jean Baptiste
(74) *Attorney, Agent, or Firm* — Arch & Lake LLP; Hao Tan; Shen Wang

(57) ABSTRACT

Methods for video decoding and encoding, apparatuses and non-transitory storage media are provided. In one decoding method, the decoder obtains a geometric partition mode (GPM) blending area index at a certain level associated with a picture, where the GPM blending area index indicates a blending area width from a set of blending area widths. The decoder obtains one or more weighting values that are used to blend prediction samples of a GPM mode based on the blending area width indicated by the GPM blending area index. Furthermore, the decoder obtains a GPM predictor based on the one or more weighting values.

20 Claims, 17 Drawing Sheets

Signal, at an encoder, a GPM blending area index at a certain level associated with a picture, where the GPM blending area index indicates a blending area width from a set of blending area widths 1801

Obtain, at the encoder, one or more weighting values that are used to blend the prediction samples of a GPM mode based on the blending area width indicated by the GPM blending area index 1802

Obtain, at the encoder, a GPM predictor based on the one or more weighting values 1803

Related U.S. Application Data

(60) Provisional application No. 63/310,093, filed on Feb. 14, 2022.

(51) Int. Cl.
H04N 19/174 (2014.01)
H04N 19/70 (2014.01)

(56) References Cited

U.S. PATENT DOCUMENTS

| | | | |
|---|---|---|---|
| 2021/0092392 A1 | 3/2021 | Reuze et al. | |
| 2021/0321102 A1 | 10/2021 | Chen | |
| 2022/0116586 A1* | 4/2022 | Esenlik | H04N 19/132 |

FOREIGN PATENT DOCUMENTS

| | | |
|---|---|---|
| WO | 2021129694 A1 | 7/2021 |
| WO | 2023250047 A1 | 12/2023 |

OTHER PUBLICATIONS

Chun-Chi Chen et al., "Non-EE2: Template matching based reordering for GPM split modes," Joint Video Experts Team (JVET) of ITU-T SG 16 WP 3 and ISO/IEC JTC 1/SC 29, JVET-Y0135-v2, 25th Meeting, by teleconference, Jan. 12-21, 2022, (3p).

Han Gao et al., "Geometric Partitioning Mode in Versatile Video Coding: Algorithm Review and Analysis", IEEE Transactions on Circuits and Systems For Video Technology, vol. 31, No. 9, Sep. 2021, (15p).

Bläser Max et al., "Prediction and Parameter Coding for Non-rectangular Block Partitioning", Jul. 1, 2020 (Jul. 1, 2020), pp. 1-241, XP093355427, (255p).

The extended European search report issued in Application number 23753544.8, dated Jan. 29, 2026. (14p).

First Office Action issued in Indian Application No. 202447068140 dated Mar. 17, 2026, (7p).

* cited by examiner

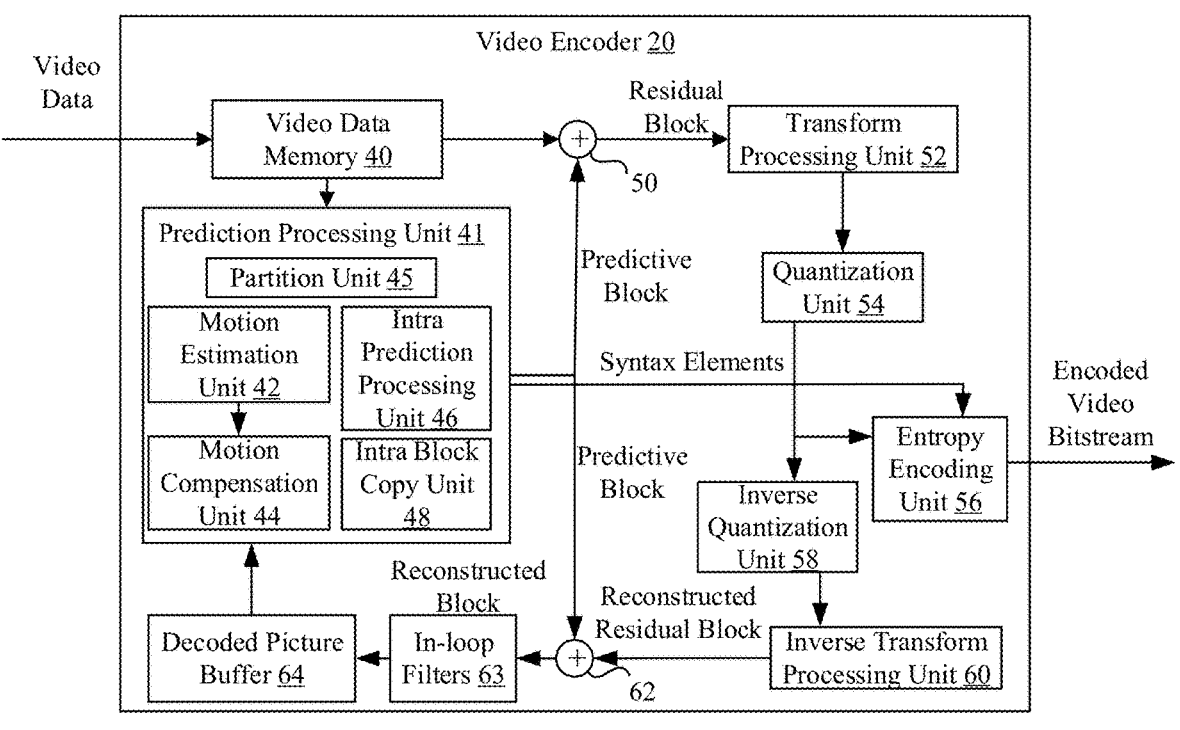
FIG. 1G
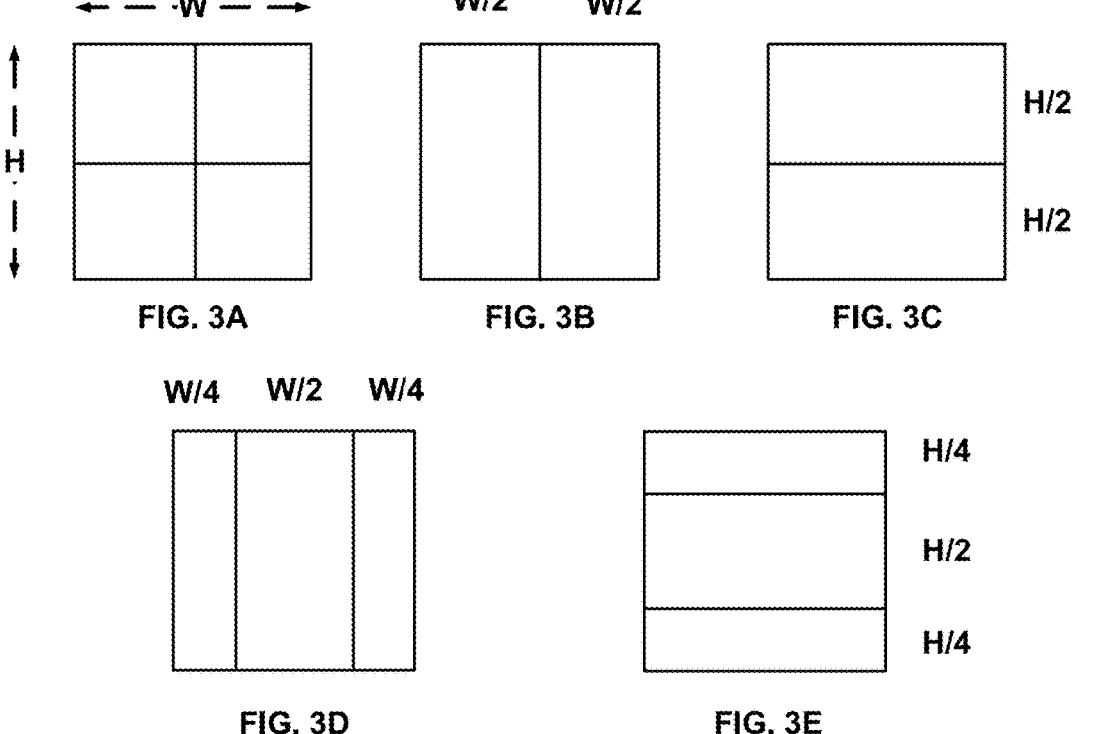
FIG. 3A        FIG. 3B        FIG. 3C
FIG. 3D        FIG. 3E Current Frame Reconstructed pixels Unavailable pixels Window Current Block

◇  801

⊘  802

⬤  803

⊕  804

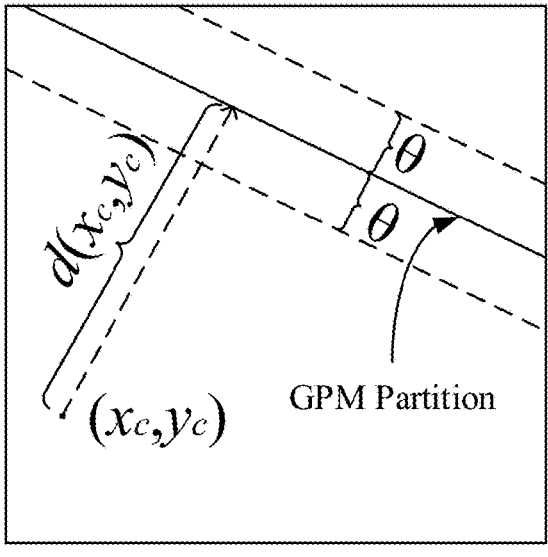

FIG. 16

| Obtain, at a decoder, a GPM blending area index at a certain level associated with a picture, where the GPM blending area index indicates a blending area width from a set of blending area widths          1701 |
| --- |
| Obtain, at the decoder, one or more weighting values that are used to blend the prediction samples of a GPM mode based on the blending area width indicated by the GPM blending area index          1702 |
| Obtain, at the decoder, a GPM predictor based on the one or more weighting values          1703 |

FIG. 17

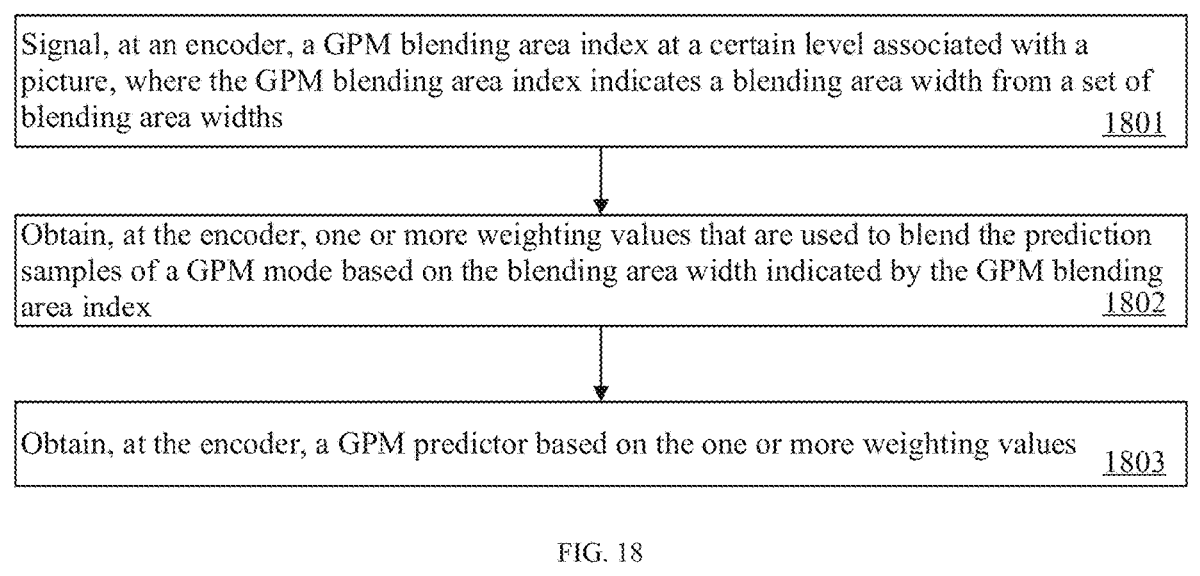

Signal, at an encoder, a GPM blending area index at a certain level associated with a picture, where the GPM blending area index indicates a blending area width from a set of blending area widths 1801

Obtain, at the encoder, one or more weighting values that are used to blend the prediction samples of a GPM mode based on the blending area width indicated by the GPM blending area index 1802

Obtain, at the encoder, a GPM predictor based on the one or more weighting values 1803

FIG. 18

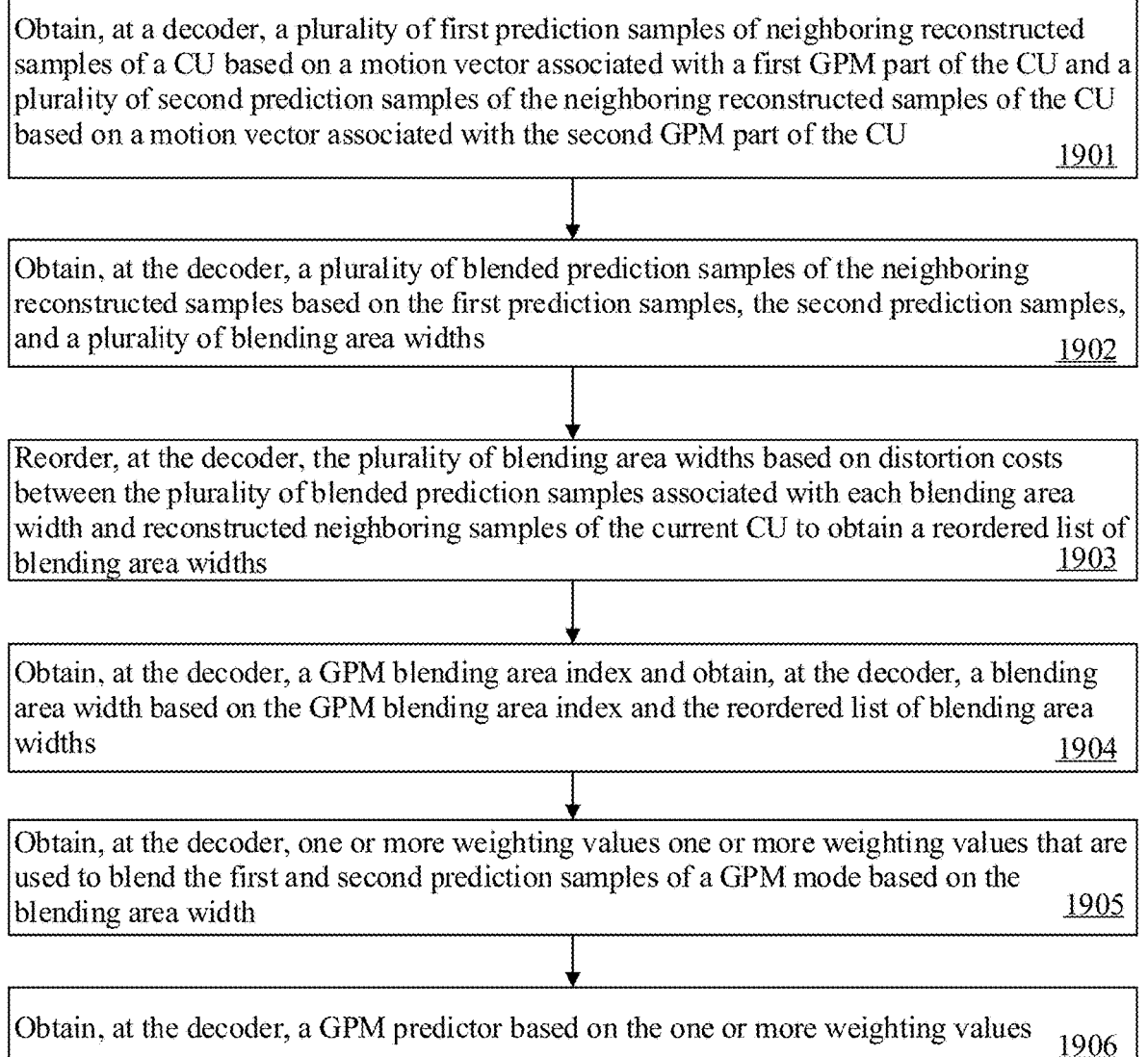

Obtain, at a decoder, a plurality of first prediction samples of neighboring reconstructed samples of a CU based on a motion vector associated with a first GPM part of the CU and a plurality of second prediction samples of the neighboring reconstructed samples of the CU based on a motion vector associated with the second GPM part of the CU
1901

Obtain, at the decoder, a plurality of blended prediction samples of the neighboring reconstructed samples based on the first prediction samples, the second prediction samples, and a plurality of blending area widths
1902

Reorder, at the decoder, the plurality of blending area widths based on distortion costs between the plurality of blended prediction samples associated with each blending area width and reconstructed neighboring samples of the current CU to obtain a reordered list of blending area widths
1903

Obtain, at the decoder, a GPM blending area index and obtain, at the decoder, a blending area width based on the GPM blending area index and the reordered list of blending area widths
1904

Obtain, at the decoder, one or more weighting values one or more weighting values that are used to blend the first and second prediction samples of a GPM mode based on the blending area width
1905

Obtain, at the decoder, a GPM predictor based on the one or more weighting values
1906

FIG. 19

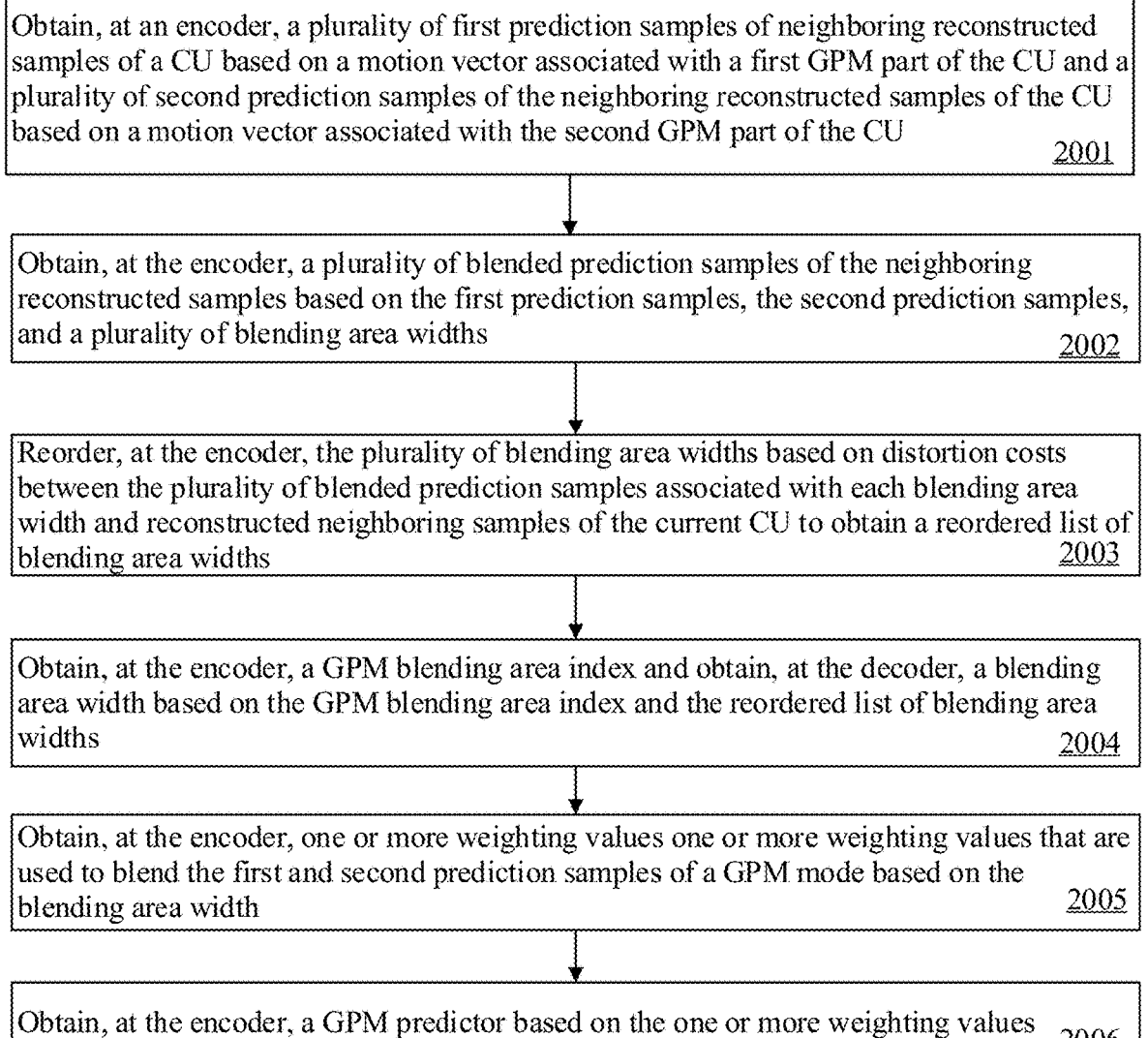

Obtain, at an encoder, a plurality of first prediction samples of neighboring reconstructed samples of a CU based on a motion vector associated with a first GPM part of the CU and a plurality of second prediction samples of the neighboring reconstructed samples of the CU based on a motion vector associated with the second GPM part of the CU    2001

Obtain, at the encoder, a plurality of blended prediction samples of the neighboring reconstructed samples based on the first prediction samples, the second prediction samples, and a plurality of blending area widths    2002

Reorder, at the encoder, the plurality of blending area widths based on distortion costs between the plurality of blended prediction samples associated with each blending area width and reconstructed neighboring samples of the current CU to obtain a reordered list of blending area widths    2003

Obtain, at the encoder, a GPM blending area index and obtain, at the decoder, a blending area width based on the GPM blending area index and the reordered list of blending area widths    2004

Obtain, at the encoder, one or more weighting values one or more weighting values that are used to blend the first and second prediction samples of a GPM mode based on the blending area width    2005

Obtain, at the encoder, a GPM predictor based on the one or more weighting values    2006

FIG. 20

METHODS AND DEVICES FOR GEOMETRIC PARTITIONING MODE WITH ADAPTIVE BLENDING

CROSS-REFERENCE TO RELATED APPLICATION

The present application is a continuation application of International Application No. PCT/US2023/013063, filed Feb. 14, 2023, which is filed upon and claims priority to U.S. Provisional Application No. 63/310,093, entitled "Methods and Devices for Geometric Partitioning Mode with Adaptive Blending," filed on Feb. 14, 2022, both disclosures of which are incorporated by reference in their entireties for all purposes.

FIELD

The present disclosure relates to video coding and compression, and in particular but not limited to, methods and apparatus on improving the coding efficiency of geometric partitioning (GPM) mode.

BACKGROUND

Various video coding techniques may be used to compress video data. Video coding is performed according to one or more video coding standards. For example, nowadays, some well-known video coding standards include Versatile Video Coding (VVC, also known as H.266 or MPEG-I Part3), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

The first version of the VVC standard was finalized in July 2020, which offers approximately 50% bit-rate saving or equivalent perceptual quality compared to the prior generation video coding standard HEVC. Although the VVC standard provides significant coding improvements than its predecessor, there is evidence that superior coding efficiency can be achieved with additional coding tools. Recently, Joint Video Exploration Team (JVET) under the collaboration of ITU-T VECG and ISO/IEC MPEG started the exploration of advanced technologies that can enable substantial enhancement of coding efficiency over VVC. In April 2021, one software codebase, called Enhanced Compression Model (ECM) was established for future video coding exploration work. The ECM reference software was based on VVC Test Model (VTM) that was developed by JVET for the VVC, with several existing modules (e.g., intra/inter prediction, transform, in-loop filter and so forth) are further extended and/or improved. In future, any new coding tool beyond the VVC standard need to be integrated into the ECM platform, and tested using JVET common test conditions (CTCs).

SUMMARY

The present disclosure provides examples of techniques relating to improving the coding efficiency of GPM mode in a video encoding or decoding process.

According to a first aspect of the present disclosure, there is provided a method of video decoding. In the method of video decoding, a decoder may obtain a geometric partition mode (GPM) blending area index at a certain level associated with a picture, where the GPM blending area index indicates a blending area width from a set of blending area widths. Additionally, the decoder may obtain one or more weighting values that are used to blend prediction samples of a GPM mode based on the blending area width indicated by the GPM blending area index. Furthermore, the decoder may obtain a GPM predictor based on the one or more weighting values.

According to a second aspect of the present disclosure, there is provided a method of video encoding. In the method of video encoding, an encoder may signal a GPM blending area index at a certain level associated with a picture, where the GPM blending area index indicates a blending area width from a set of blending area widths. Additionally, the encoder may obtain one or more weighting values that are used to blend prediction samples of a GPM mode based on the blending area width indicated by the GPM blending area index. Furthermore, the encoder may obtain a GPM predictor based on the one or more weighting values.

According to a third aspect of the present disclosure, there is provided a method of video decoding. In the method of video decoding, a decoder may obtain a plurality of first prediction samples of neighboring reconstructed samples of a coding unit (CU) based on a motion vector associated with a first GPM part of the CU and a plurality of second prediction samples of the neighboring reconstructed samples of the CU based on a motion vector associated with the second GPM part of the CU. Additionally, the decoder may obtain a plurality of blended prediction samples of the neighboring reconstructed samples based on the first prediction samples, the second prediction samples, and a plurality of blending area widths and recorder the plurality of blending area widths based on distortion costs between the plurality of blended prediction samples associated with each blending area width and reconstructed neighboring samples of the current CU to obtain a reordered list of blending area widths. Furthermore, the decoder may obtain a GPM blending area index and obtain a blending area width based on the GPM blending area index and the reordered list of blending area widths. Moreover, the decoder may obtain one or more weighting values that are used to blend the first and second prediction samples of a GPM mode based on the blending area width and obtain a GPM predictor based on the one or more weighting values.

According to a fourth aspect of the present disclosure, there is provided a method of video encoding. In the method of video encoding, an encoder may obtain a plurality of first prediction samples of neighboring reconstructed samples of a CU based on a motion vector associated with a first GPM part of the CU and a plurality of second prediction samples of the neighboring reconstructed samples of the CU based on a motion vector associated with the second GPM part of the CU. Additionally, the encoder may obtain a plurality of blended prediction samples of the neighboring reconstructed samples based on the first prediction samples, the second prediction samples, and a plurality of blending area widths and recorder the plurality of blending area widths based on distortion costs between the plurality of blended prediction samples associated with each blending area width and reconstructed neighboring samples of the current CU to obtain a reordered list of blending area widths. Furthermore, the encoder may obtain a GPM blending area index and obtain a blending area width based on the GPM blending area index and the reordered list of blending area widths. Moreover, the encoder may obtain one or more weighting values that are used to blend the first and second prediction samples of a GPM mode based on the blending area width and obtain a GPM predictor based on the one or more weighting values.

According to a fifth aspect of the present disclosure, there is provided an apparatus of video decoding including one or more processors and a memory coupled to the one or more processors and configured to store instructions executable by the one or more processors. Furthermore, the one or more processors, upon execution of the instructions, are configured to perform the method in the first or third aspect above.

According to a sixth aspect of the present disclosure, there is provided an apparatus of video encoding including one or more processors and a memory coupled to the one or more processors and configured to store instructions executable by the one or more processors. Furthermore, the one or more processors, upon execution of the instructions, are configured to perform the method in the second or fourth aspect above.

According to a seventh aspect of the present disclosure, there is provided a non-transitory computer-readable storage medium for storing computer-executable instructions that, when executed by one or more computer processors, cause the one or more computer processors to receive a bitstream, and perform the method in the first or third aspect above based on the bitstream.

According to an eighth aspect of the present disclosure, there is provided anon-transitory computer-readable storage medium for storing computer-executable instructions that, when executed by one or more computer processors, cause the one or more computer processors to perform the method in the second or fourth aspect above to encode the CU into a bitstream, and transmit the bitstream.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 1G is a block diagram illustrating an exemplary video encoder in accordance with some examples of the present disclosure

FIG. 3A is a diagram illustrating block partitions in a multi-type tree structure in accordance with some examples of the present disclosure.

FIG. 3B is a diagram illustrating block partitions in a multi-type tree structure in accordance with some examples of the present disclosure.

FIG. 3C is a diagram illustrating block partitions in a multi-type tree structure in accordance with some examples of the present disclosure.

FIG. 3D is a diagram illustrating block partitions in a multi-type tree structure in accordance with some examples of the present disclosure.

FIG. 3E is a diagram illustrating block partitions in a multi-type tree structure in accordance with some examples of the present disclosure.

FIG. 16 illustrates a soft blending area with a width of θ luma samples defined on both side of the partitioning edge in accordance with some examples of the present disclosure.

FIG. 17 is a flow chart illustrating a method for video decoding in accordance with some examples of the present disclosure.

FIG. 18 is a flow chart illustrating a method for video encoding corresponding to the method for video decoding as shown in FIG. 17 in accordance with some examples of the present disclosure.

FIG. 19 is a flow chart illustrating a method for video decoding in accordance with some examples of the present disclosure.

FIG. 20 is a flow chart illustrating a method for video encoding corresponding to the method for video decoding as shown in FIG. 19 in accordance with some examples of the present disclosure.

DETAILED DESCRIPTION

Figure 1A:
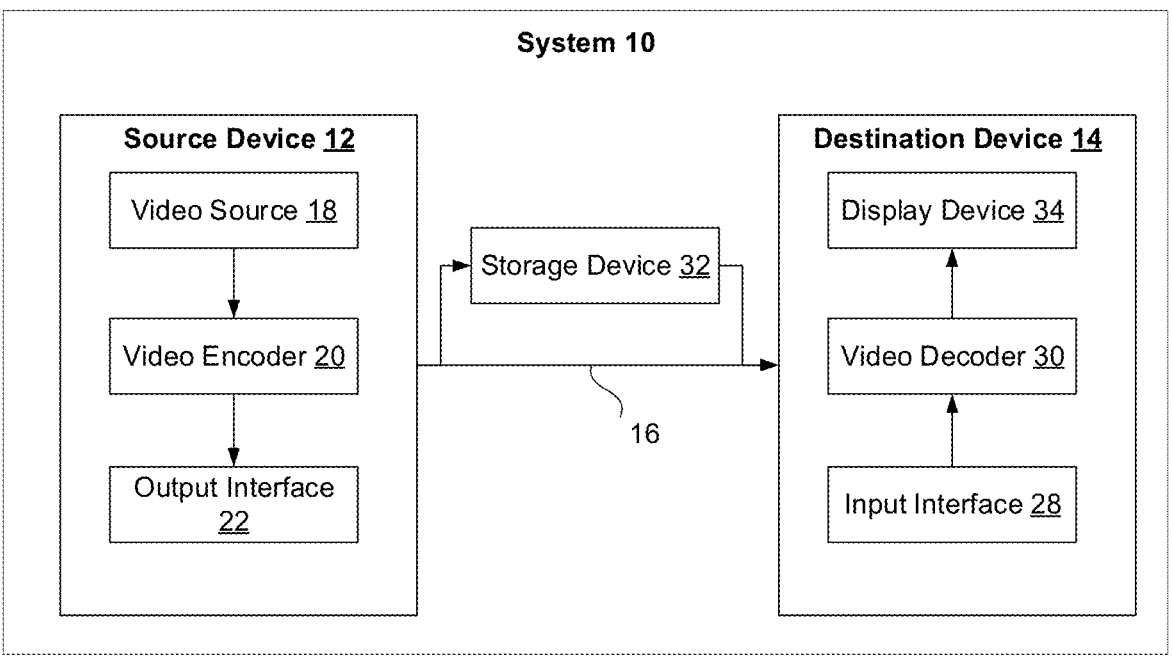
FIG. 1A is a block diagram illustrating a system for encoding and decoding video blocks in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Terms used in the disclosure are only adopted for the purpose of describing specific embodiments and not intended to limit the disclosure. "A/an," "said," and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1A is a block diagram illustrating an exemplary system 10 for encoding and decoding video blocks in parallel in accordance with some implementations of the present disclosure. As shown in FIG. 1A, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of moving the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or nonvolatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 1A, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter. The encoded video data may comprise a sequence of pictures, each of which may comprise one or more sample arrays, for example, luma (Y) only for monochrome; luma and two chroma in YCbCr or YCgCo domain; or green, blue, and red in GBR (also known as RGB) domain. For convenience of notation and terminology in this application, in some embodiments, variables and terms associated with each set of three sample arrays may be referred to as luma and chroma, where the two chroma arrays may be referred to as Cb and Cr, regardless of the actual color representation method in use. The video data may be in a chroma format of 4:0:0, 4:2:0, 4:2:2, or 4:4:4, but the present application is not limited thereto.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Like HEVC, VVC is built upon the block-based hybrid video coding framework. FIG. 1B is a block diagram illustrating a block-based video encoder in accordance with some implementations of the present disclosure. In the encoder 100, the input video signal is processed block by block, called coding units (CUs). The encoder 100 may be the video encoder 20 as shown in FIG. 1A. In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG. 3B), horizontal binary partitioning (FIG. 3C), vertical ternary partitioning (FIG. 3D), and horizontal ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block.

Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 1B:
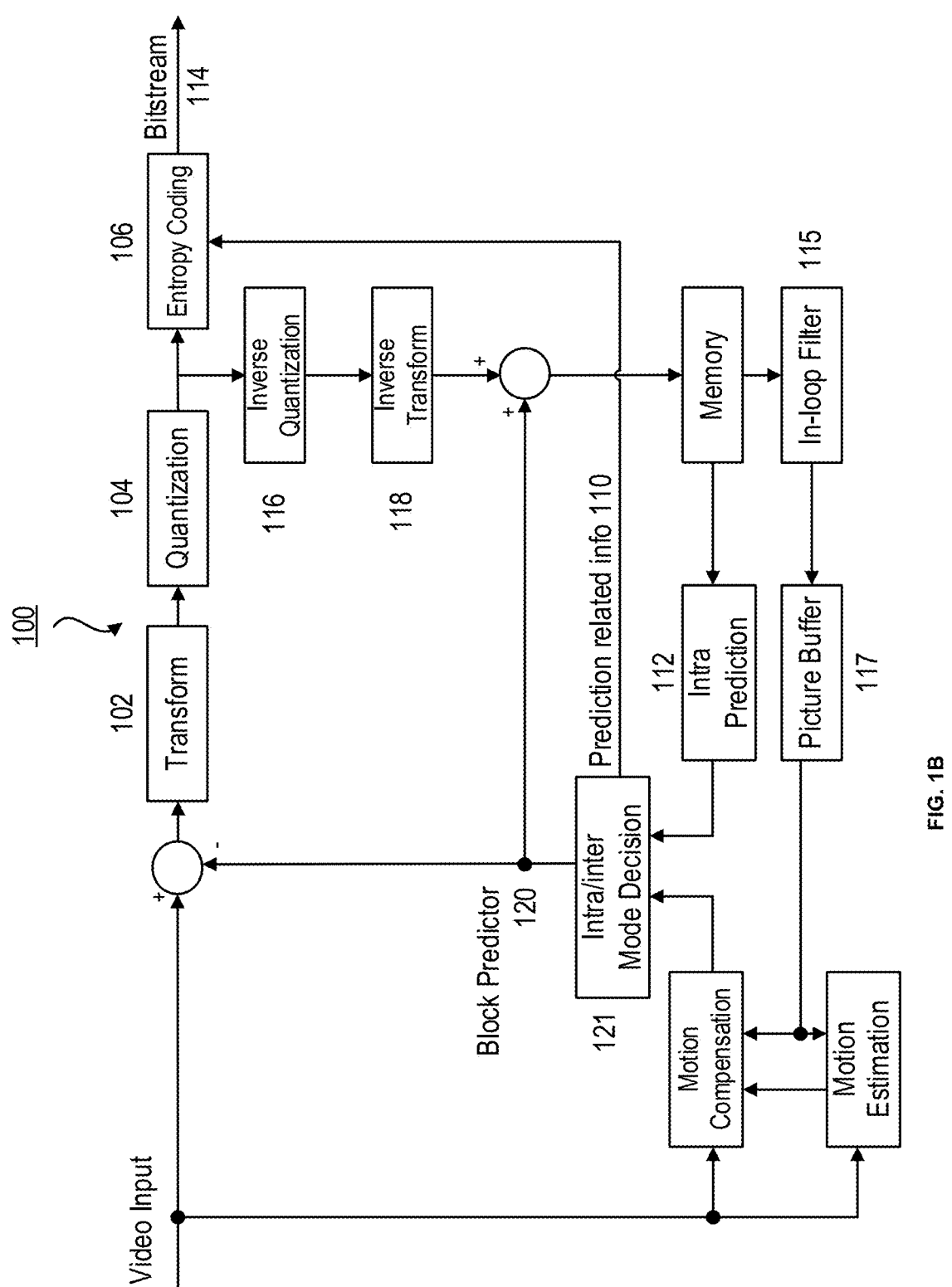
FIG. 1B is a block diagram of an encoder in accordance with some examples of the present disclosure.
Figure 2A:
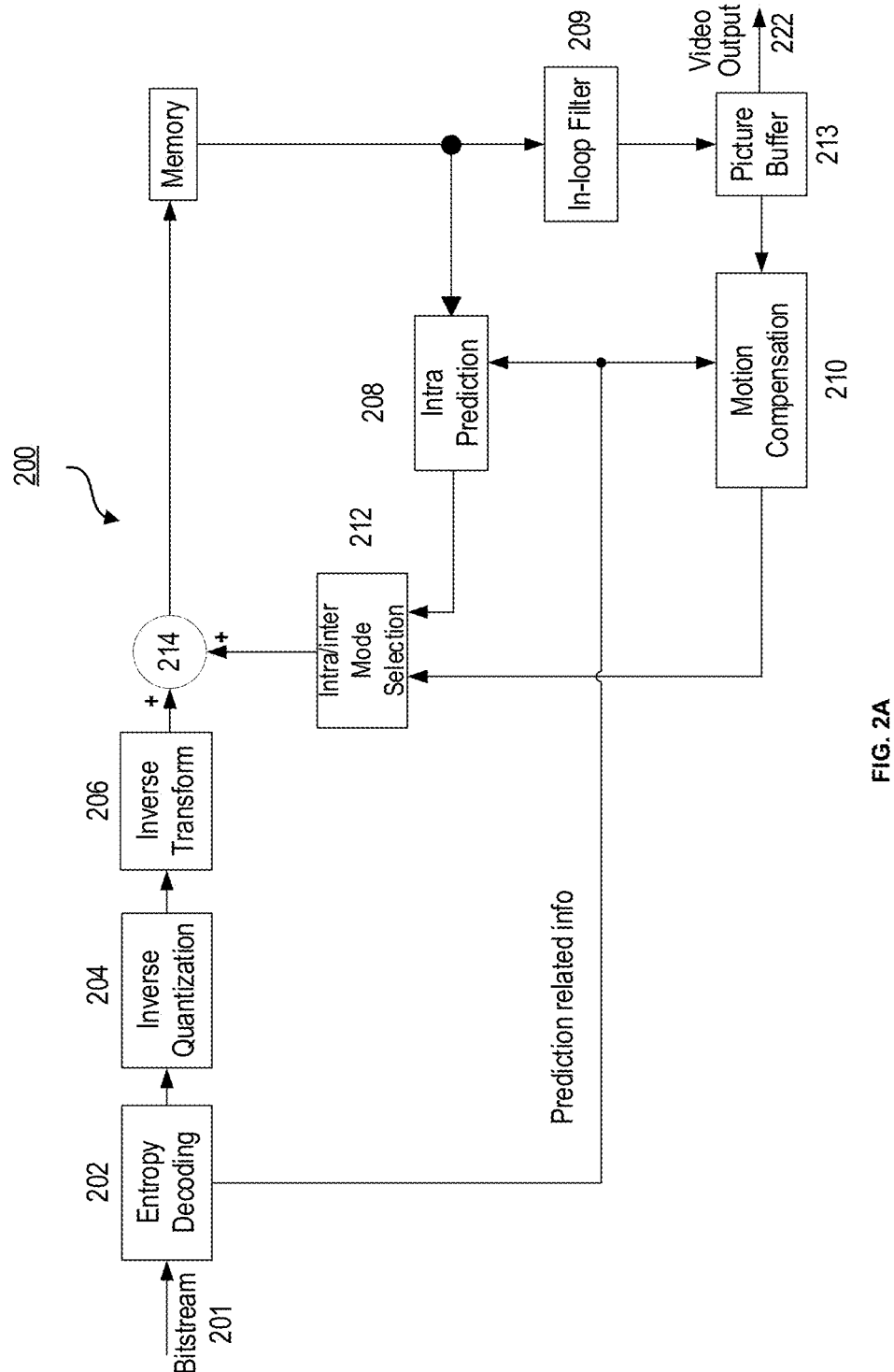
FIG. 2A is a block diagram of a decoder in accordance with some examples of the present disclosure.

FIG. 2A is a block diagram illustrating a block-based video decoder 200 which may be used in conjunction with many video coding standards. This decoder 200 is similar to the reconstruction-related section residing in the encoder 100 of FIG. 1B. The block-based video decoder 200 may be the video decoder 30 as shown in FIG. 1A. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

FIG. 1G is a block diagram illustrating another exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 1G, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. For the CCSAO technique, the present application is not limited to the embodiments described herein, and instead, the application may be applied to a situation where an offset is selected for any of a luma component and two chroma components (which may represent Y, Cb and Cr in YCbCr domain; Y, Cg and Co in YCgCo domain; or G, B and R in RGB domain for convenience of notation and terminology in this application as described above) according to any other of the luma component and the two chroma components to modify said any component based on the selected offset. Further, it should also be illustrated that a first component mentioned herein may be any of the luma component and the two chroma components, a second component mentioned herein may be any other of the luma component and the two chroma components, and a third component mentioned herein may be a remaining one of the luma component and the two chroma components. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1A. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 1G, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit

44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appro-priate intra-prediction mode to use and generate an intra-mode indicator accordingly. For example, the intra BC unit 48 may calculate rate-distortion values using a rate-distor-tion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may deter-mine an intra prediction mode to use to encode a current block. To do so, the intra prediction processing unit 46 may encode a current block using various intra prediction modes, e.g., during separate encoding passes, and the intra predic-tion processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quan-tization unit 54 quantizes the transform coefficients to fur-ther reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arith-metic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1A, or archived in the storage device 32 as shown in FIG. 1A for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpo-lation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 2B:
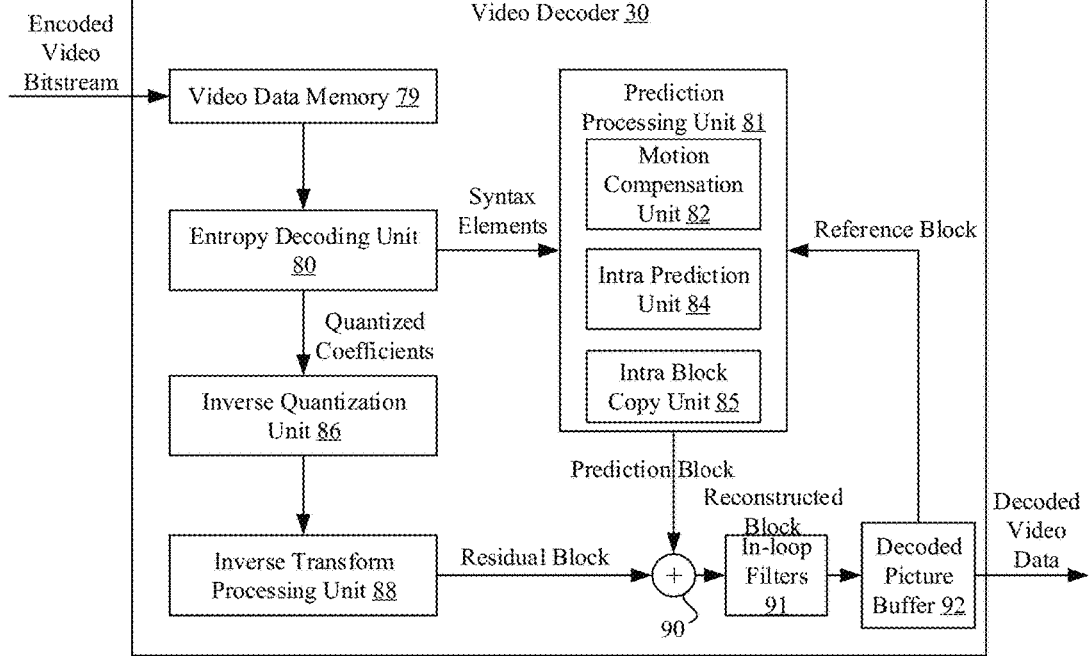
FIG. 2B is a block diagram illustrating an exemplary video decoder in accordance with some examples of the present disclosure

FIG. 2B is a block diagram illustrating another exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 1G. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 2B. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1A.

In the current VVC and AVS3 standards, motion information of the current coding block is either copied from spatial or temporal neighboring blocks specified by a merge candidate index or obtained by explicit signaling of motion estimation. The focus of the present disclosure is to improve the accuracy of the motion vectors for affine merge mode by improving the derivation methods of affine merge candidates. To facilitate the description of the present disclosure, the existing affine merge mode design in the VVC standard is used as an example to illustrate the proposed ideas. Please note that though the existing affine mode design in the VVC standard is used as the example throughout the present disclosure, to a person skilled in the art of modern video coding technologies, the proposed technologies can also be applied to a different design of affine motion prediction mode or other coding tools with the same or similar design spirit.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 1C:
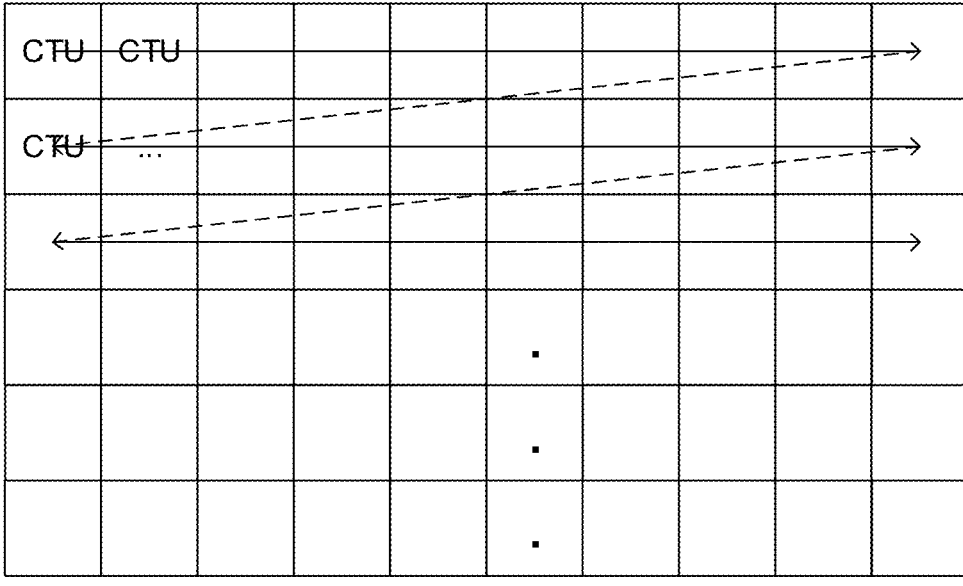
FIGS. 1C-1F are block diagrams illustrating how a frame is recursively partitioned into multiple video blocks of different sizes and shapes in accordance with some examples of the present disclosure.
Figure 1D:
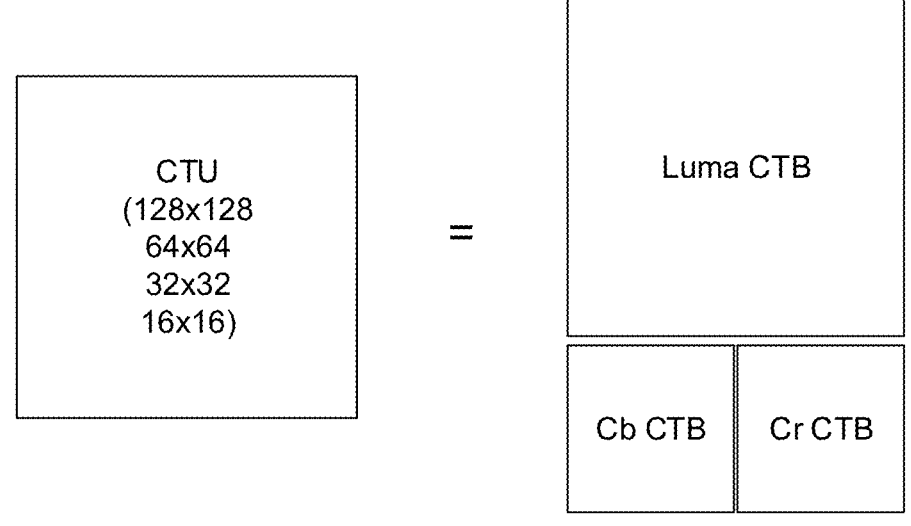

As shown in FIG. 1C, the video encoder 20 (or more specifically a partition unit in a prediction processing unit of the video encoder 20) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 1D, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 1F:
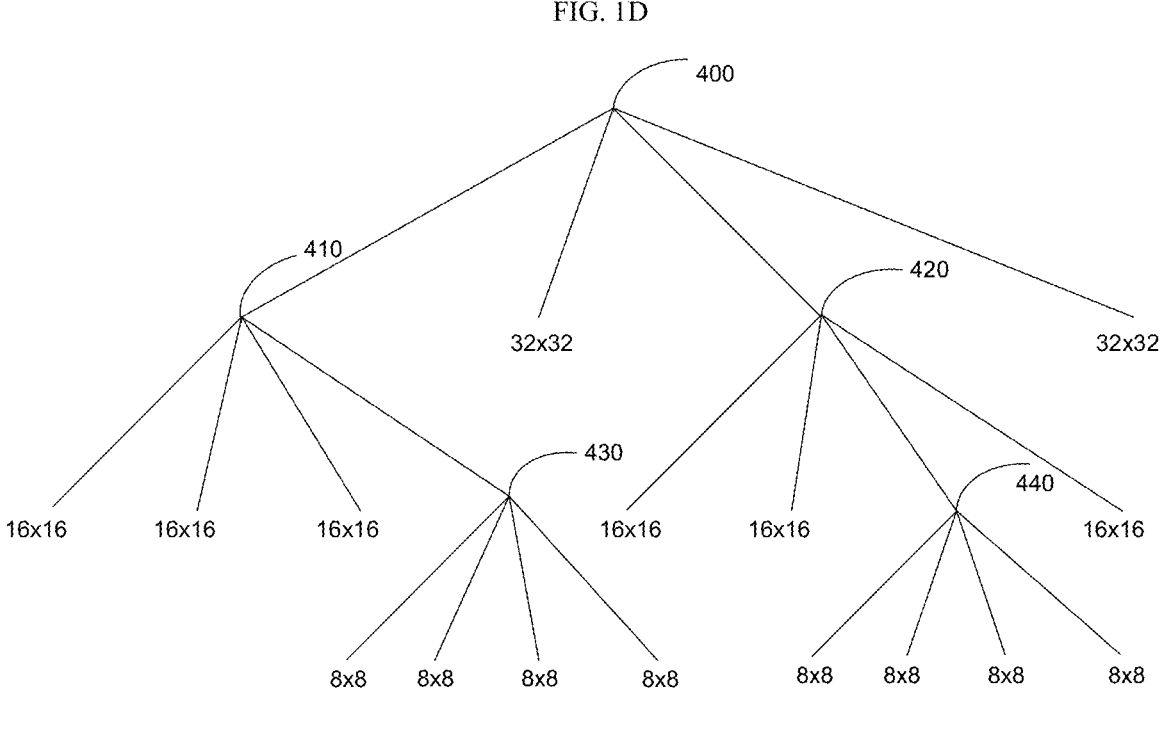
Figure 1E:
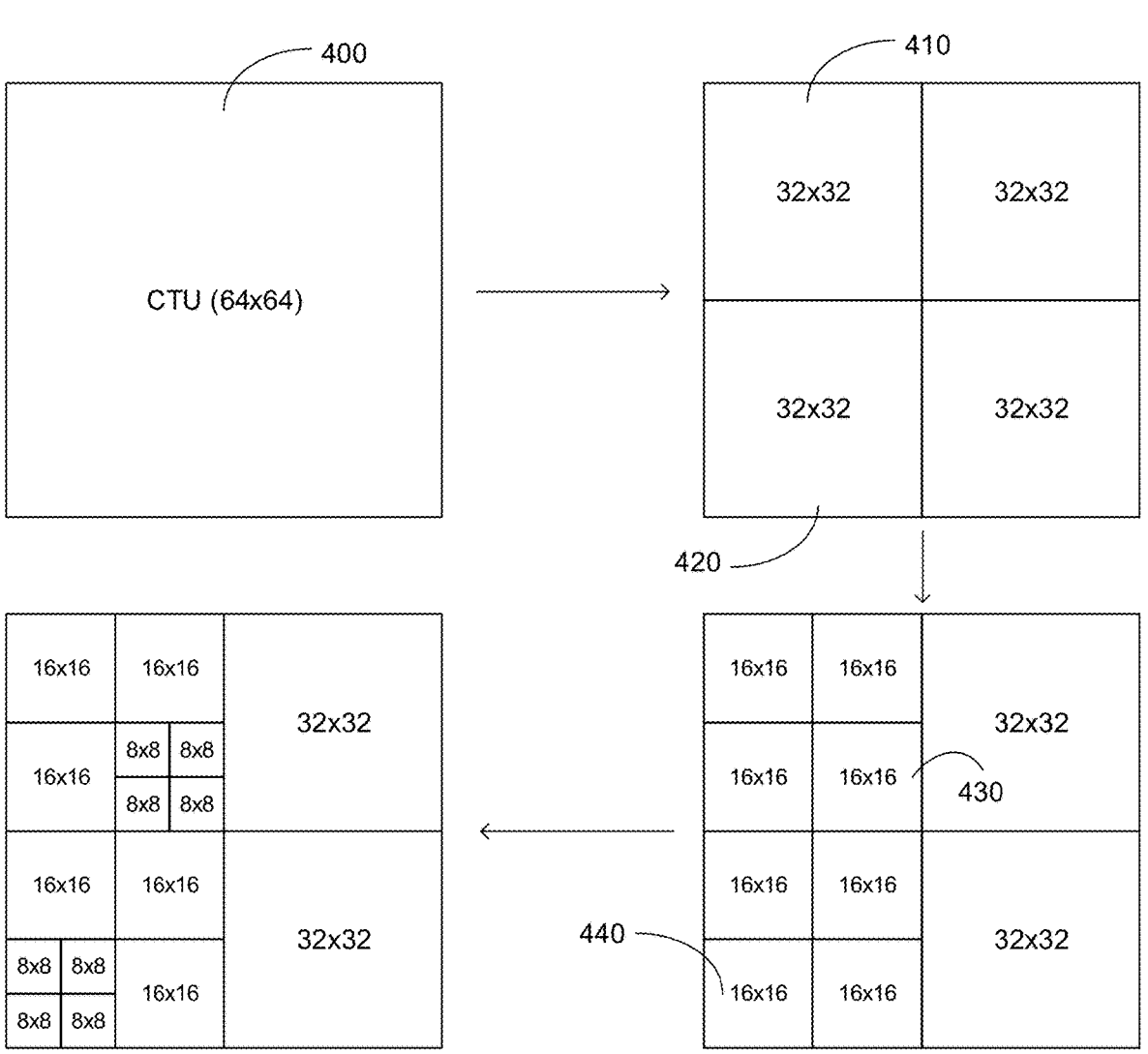

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 1E, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 1F depicts a quad-tree data structure illustrating the end result of the partition process of the CTU 400 as depicted in FIG. 1E, each leaf node of the quad-tree corresponding to one CU of a respective size ranging from 32×32 to 8×8. Like the CTU depicted in FIG. 1D, each CU may include a CB of luma samples and two corresponding coding blocks of chroma samples of a frame of the same size, and syntax elements used to code the samples of the coding blocks. In monochrome pictures or pictures having three separate color planes, a CU may include a single coding block and syntax structures used to code the samples of the coding block. It should be noted that the quad-tree partitioning depicted in FIGS. 1E-IF is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIGS. 3A-3E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 1E, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit as described above in connection with FIG. 1B, the motion vector predictor of the current CU is subtracted from the actual motion vector of the current CU to produce a Motion Vector Difference (MVD) for the current CU. By doing so, there is no need to encode the motion vector determined by the motion estimation unit for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

Similar to all the preceding video coding standards, the ECM is built upon the block-based hybrid video coding framework. The present disclosure is to further enhance the coding efficiency of the sign prediction tool that is applied in the ECM.

Geometric Partitioning Mode (GPM)

In the VVC, a geometric partitioning mode is supported for inter prediction. The geometric partitioning mode is signaled by one CU-level flag as one special merge mode. In the current GPM design, 64 partitions are supported in total by the GPM mode for each possible CU size with both width and height not smaller than 8 and not larger than 64, excluding 8×64 and 64×8.

Figure 4:
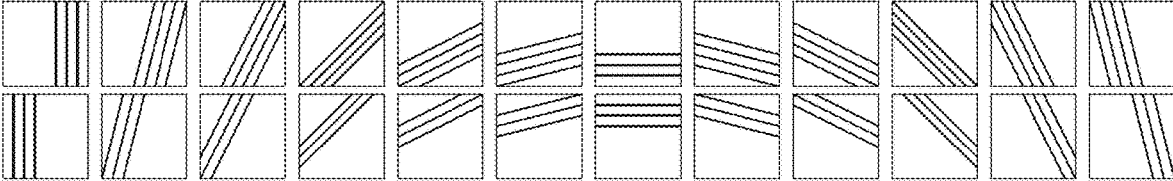
FIG. 4 illustrates allowed GPM partitions in accordance with some examples of the present disclosure.

When this mode is used, a CU is split into two parts by a geometrically located straight line as shown in FIG. 4. The location of the splitting line is mathematically derived from an angle and an offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition)

are further signaled. The number of maximum GPM candidate size is signaled explicitly at sequence level.

Uni-Prediction Candidate List Construction

Figure 5:
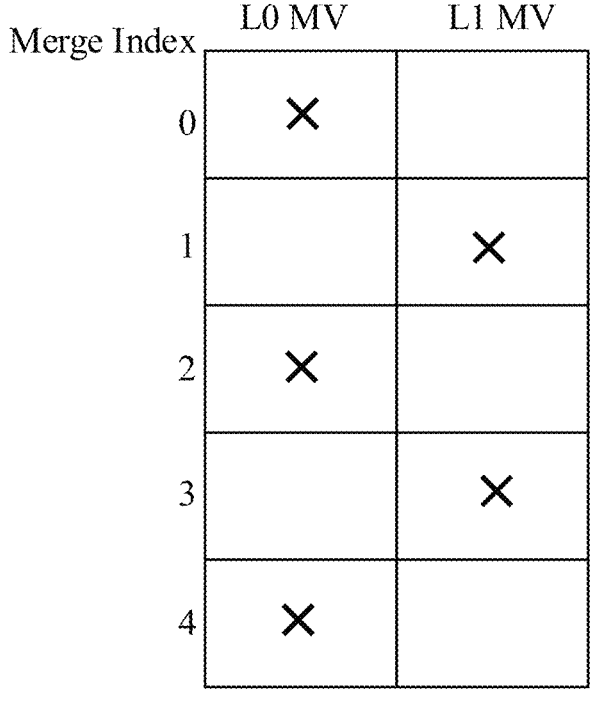
FIG. 5 is a diagram illustrating uni-prediction motion vector selection from motion vectors of merge candidate list for the GPM in accordance with some examples of the present disclosure.

To derive the uni-prediction motion vector for one geometric partition, one uni-prediction candidate list is firstly derived directly from the regular merge candidate list generation process. Denote n as the index of the uni-prediction motion in the geometric uni-prediction candidate list. The LX motion vector of the n-th merge candidate, with X equal to the parity of n, is used as the n-th uni-prediction motion vector for geometric partitioning mode. These motion vectors are marked with "x" in FIG. 5. In case a corresponding LX motion vector of the n—the extended merge candidate does not exist, the L(1–X) motion vector of the same candidate is used instead as the uni-prediction motion vector for geometric partitioning mode.

Blending Along Geometric Partition Edge

After each geometric partition is obtained using its own motion, blending is applied to the two uni-prediction signals to derive samples around geometric partition edge. The blending weight for each position of the CU are derived based on the distance from each individual sample position to the corresponding partition edge.

Figure 14:
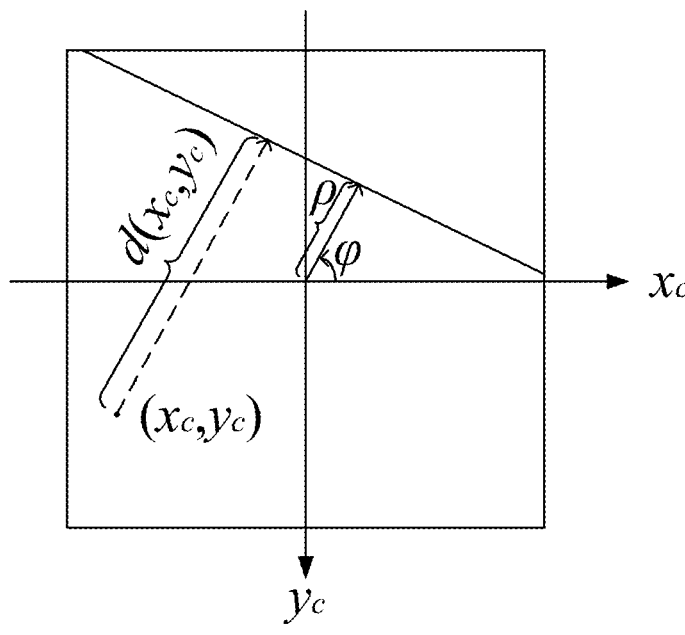
FIG. 14 illustrates a distance from an arbitrary position inside a block to a partitioning edge in accordance with some examples of the present disclosure.

As shown in FIG. 14. The distance (or displacement) $d(x_c,y_c)$ from an arbitrary position inside a block to the partitioning edge (or partitioning boundary) is mathematically defined by Hessian norm form.

$$d(x_c, y_c) = x_c\cos(\varphi) - y_c\sin(\varphi) + \rho,$$

where $x_c$ and $y_c$ denote the position relative to the central of the block; $\varphi$ denotes the angle parameter and $\rho$ denotes the offset parameter of the partitioning boundary.

To implement the displacement calculation in practice, both angle parameter and offset parameter are quantized into integer. i.e., $$d(x_c, y_c) = ((x_c + \rho_{x,j})\cos Lut[i]) \gg 3 + ((y_c + \rho_{y,j})\cos Lut[(i + 8)\ \%\ 32]) \gg 3$$

where $\rho_{x,j}$ and $\rho_{y,j}$ are quantized offset depending on the width and height of the block; and cosLut[i] denotes the quantized cosine look up table for angle parameter index i.

Finally, the continuous sample position $(x_c,y_c)$ is quantized into integer position (m,n), and the displacement d(m,n) is given by $$d(m, n) = ((m + \rho_{x,j}) \ll 1 - w + 1)\cos Lut[i] +$$
$$((n + \rho_{y,j}) \ll 1 - h + 1)\cos Lut[(i + 8)\ \%\ 32].$$

Figure 15:
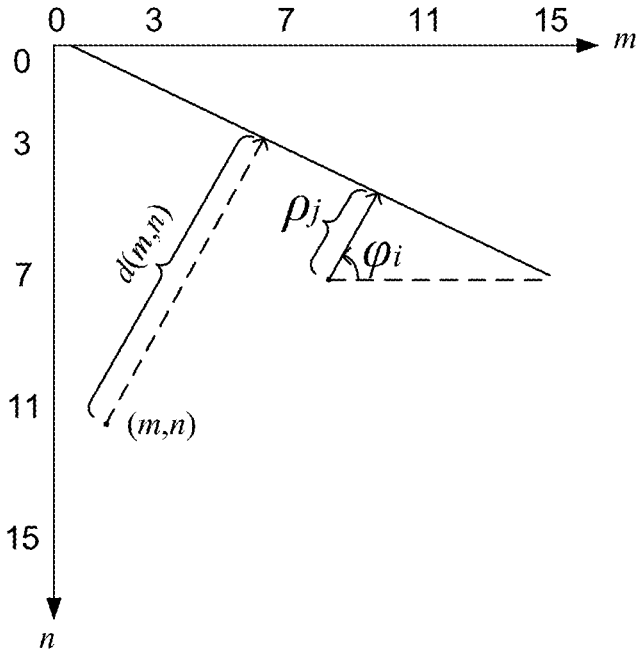
FIG. 15 illustrates a distance from an integer position obtained by quantizing the arbitrary position to the partitioning edge in accordance with some examples of the present disclosure.

The corresponding example is shown in FIG. 15.

The relationship between the quantized d(m,n) and $d(x_c, y_c)$ is given by $$d(m, n) = \lfloor 16d(x_c, y_c) + 0.5 \rfloor$$

As shown in FIG. 16, a soft blending area with a width of $\theta$ luma samples is defined on both side of the partitioning boundary. Outside of the soft blending area, only weighting value 0 or 8 can be selected. Inside the soft blending area, the weighting value $\omega(x_c,y_c)$ is computed using a ramp function $$\omega(x_c, y_c) \begin{cases} 0, & , d(x_c, y_c) \leq -\theta \\ \dfrac{8}{2\theta}(d(x_c, y_c) + \theta), & -\theta < d(x_c, y_c) < \theta \\ 8, & , d(x_c, y_c) \geq \theta \end{cases}$$

This ramp function is also quantized into integer position to obtain weighting value $\omega(m,n)$, which is used in the blending process of GPM, i.e., $$\omega(m, n) = \text{Clip3}(0, 8, (d(m, m) + 32 + 4) \gg 3)$$

Two blending matrices ($W_0$ and $W_1$) are generated using these values in different positions. The GPM predictor is then given by $$P_G = (W_0 \circ P_0 + W_1 \circ P_1 + 4) \gg 3$$

GPM Signaling Design

According to the current GPM design, the usage of the GPM is indicated by signaling one flag at the CU-level. The flag is only signaled when the current CU is coded by either merge mode or skip mode. Specifically, when the flag is equal to one, it indicates the current CU is predicted by the GPM. Otherwise (the flag is equal to zero), the CU is coded by another merge mode such as regular merge mode, merge mode with motion vector differences, combined inter and intra prediction and so forth. When the GPM is enabled for the current CU, one syntax element, namely merge_gpm_partition_idx, is further signaled to indicate the applied geometric partition mode (which specifies the direction and the offset of the straight line from the CU center that splits the CU into two partitions as shown in FIG. 4). After that, two syntax elements merge_gpm_idx0 and merge_gpm_idx1 are signaled to indicate the indices of the uni-prediction merge candidates that are used for the first and second GPM partitions. More specifically, those two syntax elements are used to determine the uni-directional MVs of the two GPM partitions from the uni-prediction merge list as described in the section "uni-prediction merge list construction". According to the current GPM design, in order to make two uni-directional MVs more different, the two indices cannot be the same. Based on such prior knowledge, the uni-prediction merge index of the first GPM partition is firstly signaled and used as the predictor to reduce the signaling overhead of the uni-prediction merge index of the second GPM partition. In details, if the second uni-prediction merge index is smaller than the first uni-prediction merge index, its original value is directly signaled. Otherwise (the second uni-prediction merge index is larger than the first uni-prediction merge index), its value is subtracted by one before being signaled to bit-stream. At decoder side, the first uni-prediction merge index is firstly decoder. Then, for the decoding of the second uni-prediction merge index, if the parsed value is smaller than the first uni-prediction merge index, the second uni-prediction merge index is set equal to the parse value; otherwise (the parsed value is equal to or larger than the first uni-prediction merge index), the second uni-prediction merge index is set equal to the parsed value plus one. Table 1 illustrates the existing syntax elements that are used for the GPM mode in the current VVC specification.

TABLE 1

| The existing GPM syntax elements in merge data syntax table of the VVC specification | |
| --- | --- |
| | Descriptor |
| merge_data( x0, y0, cbWidth, cbHeight, chType ) { | |
| ...... | |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| if( MaxNumGpmMergeCand > 2) | |
| merge_gpm_idx1[ x0 ][ y0 ] | ae(v) |
| } | |
| ...... | |
| } | |

On the other hand, in the current GPM design, truncated unary code is used for the binarization of the two uni-prediction merge indices, i.e., merge_gpm_idx0 and merge_gpm_idx1. Additionally, because the two uni-prediction merge indices cannot be the same, different maximum values are used to truncate the code-words of the two uni-prediction merge indices, which are set equal to MaxGPMMergeCand−1 and MaxGPMMergeCand−2 for merge_gpm_idx0 and merge_gpm_idx1, respectively. MaxGPMMergeCand is the number of the candidates in the uni-prediction merge list. At the decoder side, when the value of received merge_gpm_idx1 is equal to or larger than that of merge_gpm_idx0, its value will be increased by 1 given that the values of merge_gpm_idx0 and merge_gpm_idx1 cannot be the same. when the GPM/mode is applied, two different binarization methods are applied to translate the syntax merge_gpm_partition_idx into a string of binary bits. Specifically, the syntax element is binarized by fixed-length code and truncated binary code in the VVC.

Motion Signaling for Regular Inter Mode

Similar to the HEVC standard, besides merge/skip modes, both VVC and AVS3 allows one inter CU to explicitly specify its motion information in bitstream. In overall, the motion information signaling in both VVC and AVS3 are kept the same as that in the HEVC standard. Specifically, one inter prediction syntax, i.e., inter_pred_idc, is firstly signaled to indicate whether the prediction signal from list L0, L1 or both. For each used reference list, the corresponding reference picture is identified by signaling one reference picture index ref_idx_lx (x=0, 1) for the corresponding reference list, and the corresponding MV is represented by one MVP index mvp_lx_flag (x=0, 1) which is used to select the MV predictor (MVP), followed by its motion vector difference (MVD) between the target MV and the selected MVP. Additionally, in the VVC standard, one control flag mvd_l1_zero_flag is signaled at slice level. When the mvd_l1_zero_flag is equal to 0, the L1 MVD is signaled in bitstream; otherwise (when the mvd_l1_zero_flag flag is equal to 1), the L1 MVD is not signaled and its value is always inferred to zero at encoder and decoder.

Bi-Prediction with CU-Level Weight

In the previous standards before VVC and AVS3, when the weighted prediction (WP) is not applied, the bi-prediction signal is generated by averaging the uni-prediction signals obtained from two reference pictures. In the VVC, one tool coding, namely bi-prediction with CU-level weight (BCW), was introduced to improve the efficiency of bi-prediction. Specifically, instead of simple averaging, the bi-prediction in the BCW is extended by allowing weighted averaging of two prediction signals, as depicted as:

$$P'(i, j) = ((8 - w) \cdot P_0(i, j) + w \cdot P_1(i, j) + 4) \gg 3$$

In the VVC, when the current picture is one low-delay picture, the weight of one BCW coding block is allowed to be selected from a set of predefined weight values $w \in \{-2, 3, 4, 5, 10\}$ and weight of 4 represents traditional bi-prediction case where the two uni-prediction signals are equally weighted. For low-delay, only 3 weights $w \in \{3, 4, 5\}$ are allowed. Generally speaking, though there are some design similarities between the WP and the BCW, the two coding tools are targeting at solving the illumination change problem at different granularities. However, because the interaction between the WP and the BCW could potentially complicate the VVC design, the two tools are disallowed to be enabled simultaneously. Specifically, when the WP is enabled for one slice, then the BCW weights for all the bi-prediction CUs in the slice are not signaled and inferred to be 4 (i.e., the equal weight being applied).

Template Matching

Figure 6:
FIG. 6 is a diagram illustrating template matching algorithm in accordance with some examples of the present disclosure.

Template matching (TM) is a decoder side MV derivation method to refine the motion information of the current CU by finding the best match between one template which consists of top and left neighboring reconstructed samples of the current CU and a refence block (i.e., same size to the template) in a reference picture. As illustrated in FIG. 6, one MV is to be searched around the initial motion of the current CU within a [−8, +8]-pel search range. Best match may be defined as the MV that achieves the lowest matching cost, for example, sum of absolute difference (SAD), sum of absolute transformed difference (SATD) and so forth, between the current template and the reference template. There are two different ways to apply the TM mode for inter coding described as follows.

In AMVP mode, an MVP candidate is determined based on template matching difference to pick up the one which reaches the minimum difference between current block template and reference block template, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in the below Table 2. This search process ensures that the MVP candidate still keeps the same MV precision as indicated by AMVR mode after TM process.

TABLE 2

| Search pattern | AMVR mode | | | | Merge mode | |
| | 4-pel | Full-pel | Half-pel | Quarter-pel | AltIF = 0 | AltIF = 1 |
| --- | --- | --- | --- | --- | --- | --- |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As shown in the above Table 2, TM may perform all the way down to 1/8-pel MVD precision or skipping those beyond half-pel MVD precision, depending on whether the alternative interpolation filter (that is used when AMVR is of half-pel mode) is used according to merged motion information.

Decoder-Side Intra Mode Derivation (DIMD)

DIMD is an intra coding tool wherein the luma intra prediction mode (IPM) is not transmitted via the bitstream. Instead, it is derived using previously encoded/decoded pixels, in an identical fashion at the encoder and at the decoder. The DIMD method performs a texture gradient processing to derive 2 best modes. These two modes and planar mode are then applied to the block and their predictors are weighted averaged. The selection of DIMD is signaled in the bitstream for intra coded blocks using a flag. At the decoder, if the DIMD flag is true, the intra prediction mode is derived in the reconstruction process using the same previously encoded neighboring pixels. If not, the intra prediction mode is parsed from the bitstream as in classical intra coding mode.

Figures 7, 8:
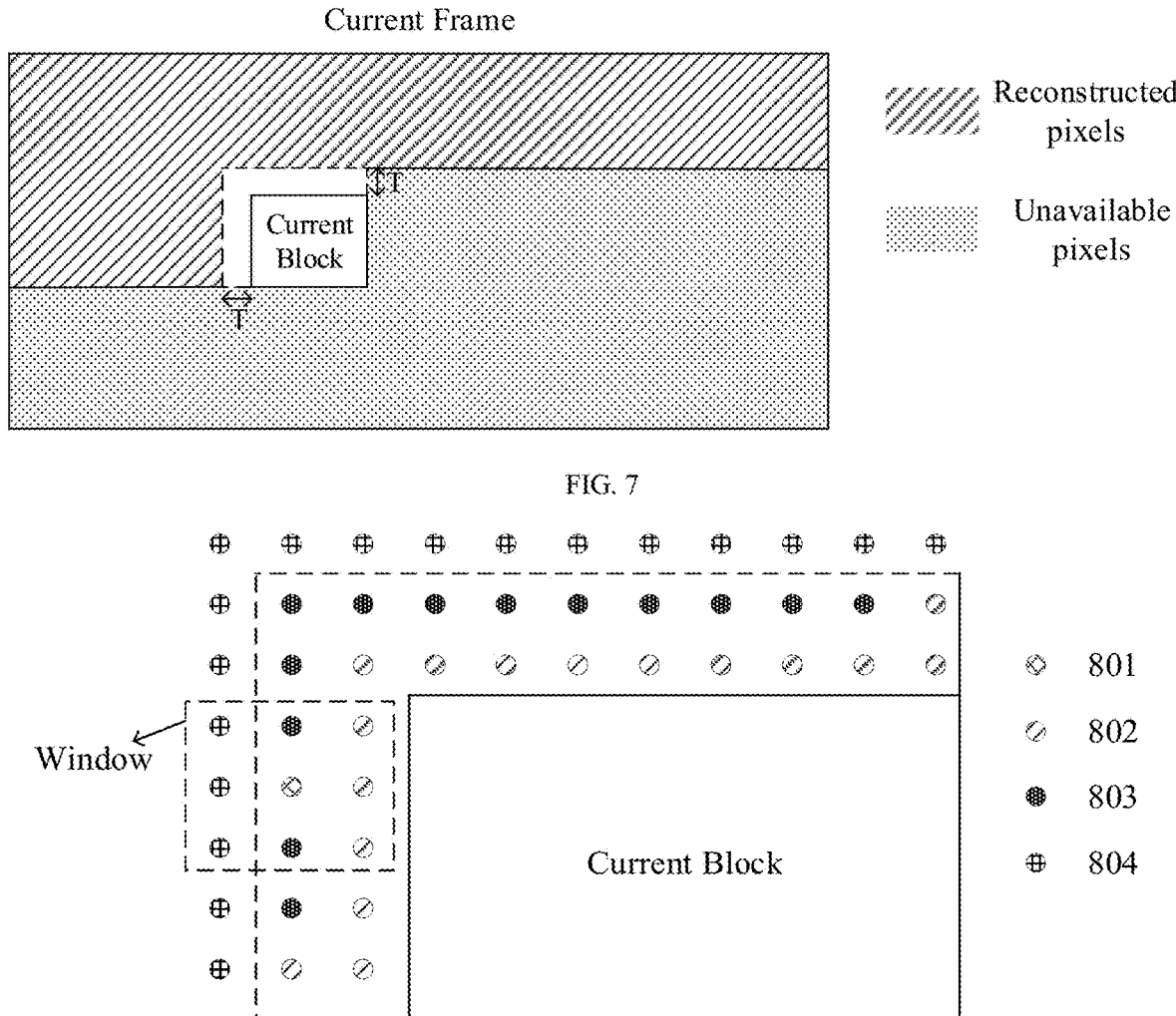
FIG. 7 illustrates a set of chosen pixels on which a gradient analysis is performed in accordance with some examples of the present disclosure.
FIG. 8 illustrates convolution of a 3×3 Sobel gradient filter with the template in accordance with some examples of the present disclosure.

To derive the intra prediction mode for a block, a set of neighboring pixels must be firstly selected and a gradient analysis will be performed on the set of neighboring pixels that are selected. For normativity purposes, these pixels should be in the decoded/reconstructed pool of pixels. As shown in FIG. 7, a template may be chosen surrounding the current block by T pixels to the left, and T pixels above. Next, a gradient analysis may be performed on the pixels of the template. This allows to determine a main angular direction for the template, which it is assumed to (and that is the core premise of the present disclosure) have a high chance to be identical to the one of the current block. Thus, a simple 3×3 Sobel gradient filter may be used, defined by the following matrices that will be convoluted with the template:

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix}$$

For each pixel of the template, each of these two matrices may be point-by-point multiplied with the 3×3 window centered around the current pixel and composed of its 8 direct neighbors, and the result may be summed up. Thus, two values Gx (from the multiplication with Mx), and Gy (from the multiplication with My) corresponding to the gradient at the current pixel, in the horizontal and vertical direction respectively may be obtained.

FIG. 8 shows the convolution process. The pixel 801 is the current pixel. Pixels 803 and the pixel 801 are pixels on which the gradient analysis is possible. Pixels 802 are pixels on which the gradient analysis is not possible due to lack of some neighbors. Pixels 804 are available (reconstructed) pixels outside of the considered template, used in the gradient analysis of the pixels 803. In case a pixel 804 is not available (due to blocks being too close to the border of the picture for instance), the gradient analysis of all pixels 803 that use this pixel 804 is not performed. For each pixel 803, the intensity (G) and the orientation (O) of the gradient may be computed using Gx and Gy as such:

$$G = |G_x| + |G_y| \text{ and } O = atan\left(\frac{G_y}{G_x}\right)$$

The orientation of the gradient is then converted into an intra angular prediction mode, used to index a histogram (first initialized to zero). The histogram value at that intra angular mode is increased by G. Once all the pixels 803 in the template have been processed, the histogram will contain cumulative values of gradient intensities, for each intra angular mode. The IPMs corresponding to two tallest histogram bars are selected for the current block. If the maximum value in the histogram is 0 (meaning no gradient analysis was able to be made, or the area composing the template is flat), then the DC mode is selected as intra prediction mode for the current block.

Figure 9:
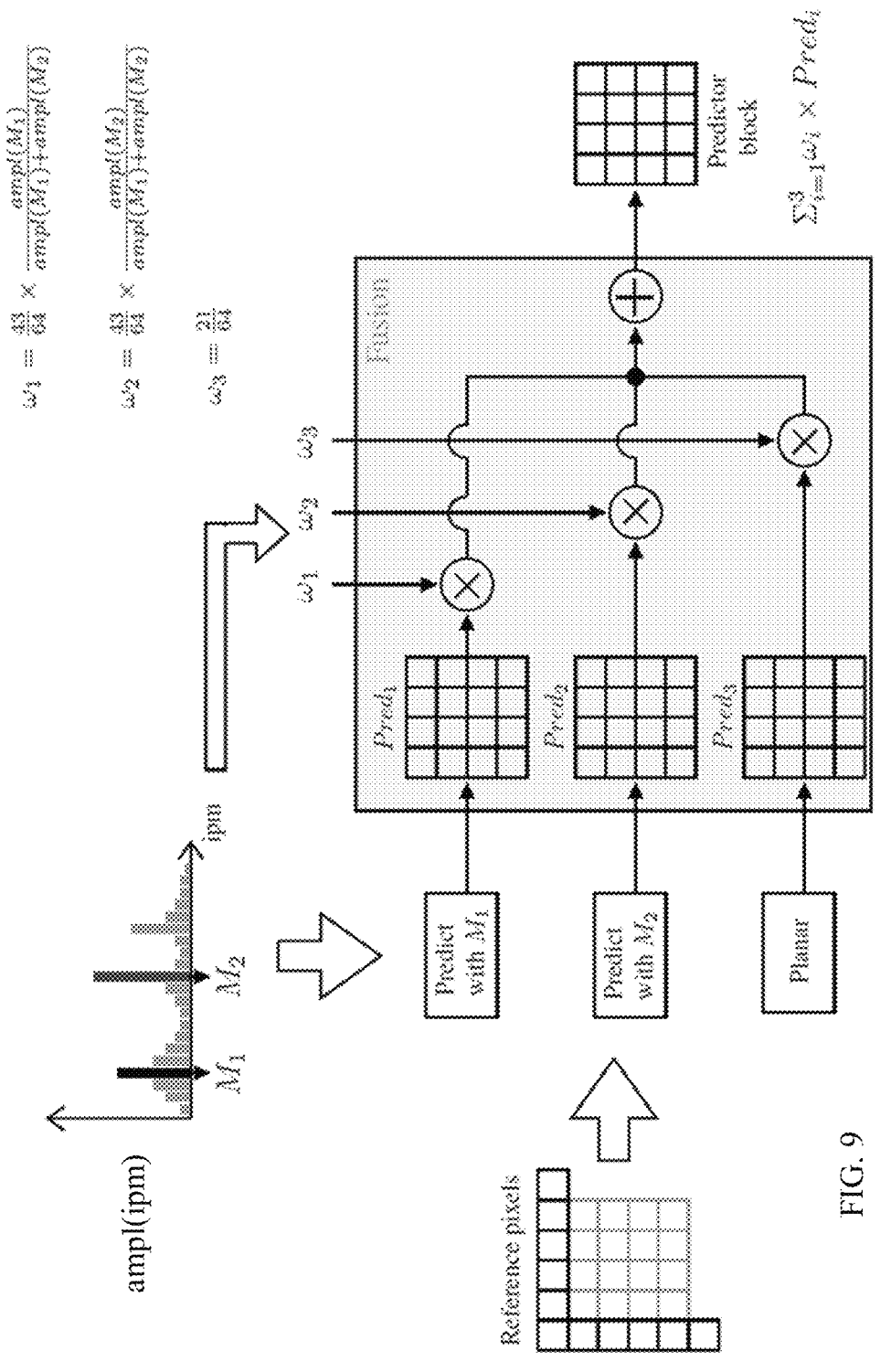
FIG. 9 illustrates prediction fusion by weighted averaging of two HoG modes and planar mode in accordance with some examples of the present disclosure.

The two IPMs corresponding to two tallest histogram of oriented gradient (HoG) bars are combined with the Planar mode. The prediction fusion is applied as a weighted average of the above three predictors. To this aim, the weight of planar is fixed to 21/64 (~1/3). The remaining weight of 43/64 (~2/3) is then shared between the two HoG IPMs, proportionally to the amplitude of their HoG bars. FIG. 9 visualizes this process.

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

Template-Based Intra Mode Derivation (TIMD)

Figure 10:
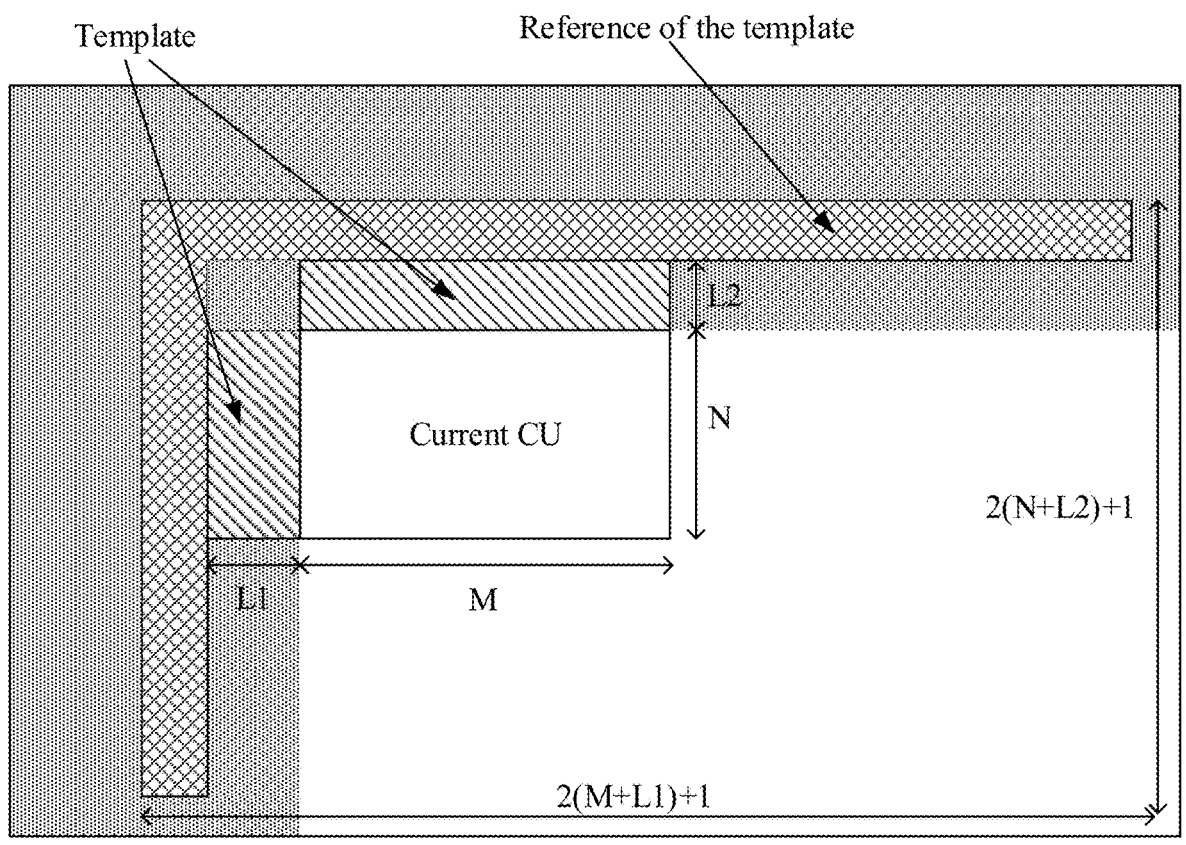
FIG. 10 illustrates a template and its reference samples used in Template-based intra mode derivation (TIMD) in accordance with some examples of the present disclosure.

For each intra mode in MPMs, the sum of absolute transformed differences (SATD) between prediction and reconstruction samples of the template region shown in FIG. 10 is computed and the intra modes with the first two modes with the smallest SATD cost are chosen and then fuse them with the weights, and such weighted intra prediction is used to code the current CU.

The costs of the two selected modes are compared with a threshold, in the test the cost factor of 2 is applied as follows:

$$costMode2 < 2 * costMode1.$$

If this condition is true, the fusion is applied, otherwise the only model is used.

Weights of the modes are computed from their SATD costs as follows:

$$weight1 = costMode2/(costMode1 + costMode2)$$

$$weight2 = 1 - weight1.$$

Geometric Partitioning Mode with Template Matching (TM)

In ECM, template matching (TM) is applied on top of the geometric partitioning mode. When GPM is enabled for the current CU, two set of uni-directional motion information of GPM are derived from the GPM merge candidate list for each part of GPM, respectively. The GPM merge candidate list is constructed as follows.

In one example, interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.

In another example, interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.

In another example, zero MV candidates are padded until the GPM candidate list is full.

A CU-level flag may be further signaled to indicate that TM is enabled for GPM, that is, both motion vector of GPM is further refined using template matching. During this template matching, one of following template type will be used for the refinement, i.e., above (A), left (L), above plus left (A+L) of the current block. In the current solution of ECM3.1 (adopted from JVET W0065), the template type is selected based on the angle parameter of GPM, as shown in the following Table 3.

Template matching-based GPM split modes reordering method is first proposed in the JVET document JVET-Y0135. The template-matching cost for each GPM split mode is calculated and the split modes are reordered based on the cost both at the encoder and decoder side. Only the best N, where N smaller or equal to 64, candidates are available. The GPM mode index is signaled using variable-length code, such as Golomb-Rice code, instead of fixed-length binary code.

The reordering method for GPM split modes is a two-step process after the respective reference templates of the two GPM partitions in a coding unit are generated, as follows.

Firstly, blending the reference templates of the two GPM partitions using the respective weights of split modes (i.e., resulting in 64 blended reference templates) and computing the respective TM costs of these blended reference templates;

Secondly, reordering the TM costs in ascending order and marking the best N candidates as available split modes.

Figure 11:
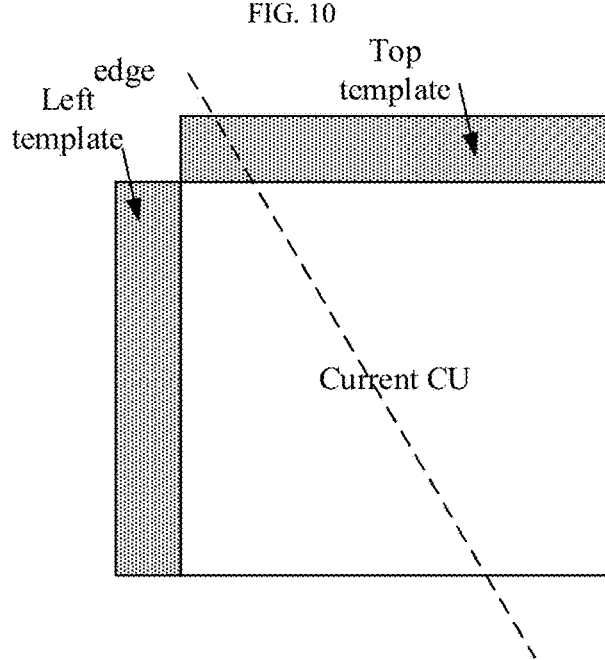
FIG. 11 illustrates blending of the template used for reordering of GPM split modes in accordance with some examples of the present disclosure.

The edge on the template is extended from that of the current CU, as FIG. 11 illustrates. The corresponding weights used in the blending process of templates are computed similar to the GPM weight derivation process. The only difference is as follows.

First is that the sample positions (relative to the original of the CU) on the template are used to derive weights.

In addition, weights are mapped to 0 and 8 before use depending on whichever is closer and thus the edge on templates is clean cut for computational simplification in the blending process of templates.

GPM with Inter and Intra Prediction

In an example of GPM design, the final prediction is generated using two uni-predicted inter predictions. A method that combines inter and intra prediction for GPM were introduced by JVET-X0166 and JVET-Y0065.

In GPM with inter and intra prediction, the final prediction samples are generated by weighting inter predicted samples and intra predicted samples for each GPM-separated region. Each part contains flag to indicate inter or intra prediction is used. The inter predicted samples are derived by the same scheme of the current GPM, whereas the intra predicted samples are derived by an intra prediction mode (IPM) candidate list and an index signaled from the encoder. The IPM candidate list size is pre-defined as 3. The available

TABLE 3

| Partition angle | 0 | 2 | 3 | 4 | 5 | 8 | 11 | 12 | 13 | 14 |
|---|---|---|---|---|---|---|---|---|---|---|
| 1st partition | A | A | A | A | L+A | L+A | L+A | L+A | A | A |
| 2nd partition | L+A | L+A | L+A | L | L | L | L | L+A | L+A | L+A |
| Partition angle | 16 | 18 | 19 | 20 | 21 | 24 | 27 | 28 | 29 | 30 |
| 1st partition | A | A | A | A | L+A | L+A | L+A | L+A | A | A |
| 2nd partition | L+A | L+A | L+A | L | L | L | L | L+A | L+A | L+A |

The motion is then refined by minimizing the difference between the current template and the template in the reference picture using the same search pattern of merge mode with half-pel interpolation filter disable.

Template Matching-Based Reordering for GPM Split Modes

In VVC and ECM-3.1, there are 64 GPM split modes and the use of split mode of each GPM coding unit (CU) is signaled using fixed-length binary code. This coding method may imply that all GPM split modes are treated as equal-probable events, and thus a fixed-length code could be used accordingly for signaling.

Figures 12A, 12B, 12C, 12D, 13:
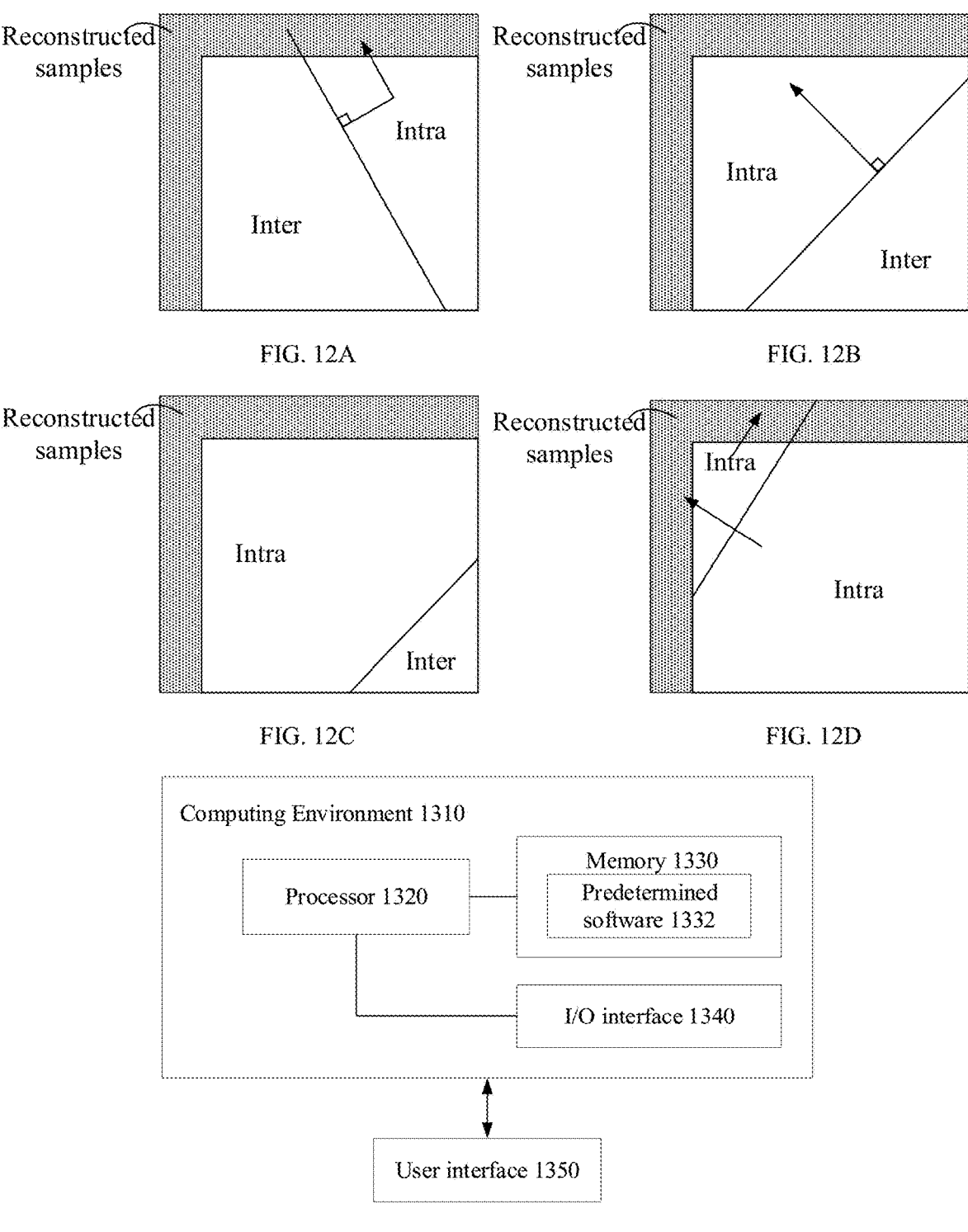
FIG. 12A-12C illustrate available intra prediction mode (IPM) candidates for GPM with inter and intra prediction in accordance with some examples of the present disclosure.
FIG. 12D illustrates a disabled combination in which two intra predictions exist in accordance with some examples of the present disclosure.
FIG. 13 is a diagram illustrating a computing environment coupled with a user interface in accordance with some examples of the present disclosure.

IPM candidates are the parallel angular mode against the GPM block boundary (Parallel mode), the perpendicular angular mode against the GPM block boundary (Perpendicular mode), and the Planar mode as shown FIGS. 12A-12C, respectively. Furthermore, GPM with intra and intra prediction as shown FIG. 12D is restricted in the proposed method to reduce the signaling overhead for IPMs and avoid an increase in the size of the intra prediction circuit on the hardware decoder. In addition, a direct motion vector and IPM storage on the GPM-blending area is introduced to further improve the coding performance.

Furthermore, the IPM list of GPM intra may be further improved by DIMD, TIMD, and angular modes from the neighboring blocks. More specifically, the parallel mode is used in the first place of IPM list, then IPM candidates of TIMD, DIMD, and angular modes from neighbors are used, pruning between candidates are performed.

As for the neighboring mode derivation, there are five positions for available neighboring blocks at most, but they are restricted by the angle of GPM block boundary as shown in the following Table 4.

TABLE 4

| Angle of GPM | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |

| Partition angle | 16 | 18 | 19 | 20 | 21 | 24 | 27 | 28 | 29 | 30 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |

In the current GPM design, a soft blending area is defined to generate a soft blending mask (or blending matrix). However, the width of blending area $\theta$ (i.e., the strength of the blending) is hard coded as 2 luma samples width of each side of the partitioning boundary. This may not be suitable for all content types.

For example, for screen content, objects usually contain sharper edges, which need a sharper blending (i.e., smaller blending area width $\theta$). On the contrary, for some nature content, the edge of object can be less sharp with feathering effect, thus, a less sharper blending is needed (i.e., a larger blending area width $\theta$).

Moreover, in the current GPM design, the blending weighting values are selected in the range of [0,8] (i.e., 3-bits precision when not considering 0, or 4-bits precision when considering 0). The bit depth (precision) of the blending weighting values can be too low to accurately express the real blending area.

In the present disclosure, methods and devices are provided to adaptively select the blending strength, or the width of the soft blending are $\theta$ for GPM blending operation.

In some examples, as described above, the weighing value in the blending matrix is given by $$\omega(x_c, y_c) = \begin{cases} 0, & , d(x_c, y_c) \le -\theta \\ \frac{8}{2\theta}(d(x_c, y_c) + \theta), & -\theta < d(x_c, y_c) < \theta \\ 8, & , d(x_c, y_c) \ge \theta \end{cases}$$

and $$\omega(m, n) = \text{Clip3}(0, 8, (d(m, m) + 32 + 4) \gg 3)$$

in the current GPM design.

More generally, weighting value is given by $$\omega(x_c, y_c) = \begin{cases} 0, & , d(x_c, y_c) \le -\theta \\ \frac{2^b}{2\theta}(d(x_c, y_c) + \theta), & -\theta < d(x_c, y_c) < \theta \\ 8, & , d(x_c, y_c) \ge \theta \end{cases}$$

where b denotes the bit depths of the weighting value precision. Note that in this solution we use not including 0 case as example to express the bit depth. That is, if b=3, the allowed weighting value is in range of [0, 8].

The generalized quantized form is then given by $$\omega(m, n) = \text{Clip3}\left(0, 2^b, \text{round}\left(\frac{(d(m, n) + 16\theta)}{\theta 2^{(5-b)}}\right)\right)$$

To adaptively select the GPM blending strength for different types of video content (i.e., for more sharper or less sharp moving object boundaries), several useful blending strength (or blending area width) values need to be first pre-defined both at the encoder and decoder side. Note that usually 0 or shiftable values (i.e., $2^n$, with n equals to 1,2, 3 . . . ) are used for the blending width $\theta$, which may simplify the hardware implementation. In one example, three blending width with $\theta=0$, $\theta=1$, and $\theta=2$ luma samples are used in this solution.

In some examples, a blending width index (or flag, if only two different blending width values are defined), which indicate the used blending strength, is signaled in the high-level syntax, for example in the picture header or in the slice header. In the picture header signaling case, each picture may have a different GPM blending width, while in the slice header signaling case, each slice can have a different GPM blending width. An example picture header syntax table is given in Table 5 below. As shown in Table 5, the bolded and italicized syntax element ph_gpm_blending_idx is used in the picture header as a blending width index.

TABLE 5

| | Descriptor |
|---|---|
| picture_header_structure( ) { | |
| ... | |
| ph_gpm_blending_idx | ue(v) |
| ... | |

In addition, an adaptive blending enabling flag may be further added on top of the introduced solution in high-level syntax. That is, when adaptive blending is enabled (i.e., the adaptive blending enable flag is true or equal to one, the blending index syntax element is signaled, otherwise, when adaptive blending flag is disabled (i.e., the adaptive blending enabling flag is false or equals to another value), the blending index is not signaled and set as a default value. An example syntax table is shown in Table 6. The syntax element ph_gpm_blending_idx may be the blending index syntax element and the syntax element ph_gpm_adaptive_blending may be the adaptive blending enabling flag.

TABLE 6

| | Descriptor |
|---|---|
| picture_header_structure( ) { | |
| ... | |
| ph_gpm_adaptive_blending | u(1) |
| if (ph_gpm_adaptive_blending) | |
| ph_gpm_blending_idx | ue(v) |
| ... | |

When ph_gpm_blending_idx is not present, it is inferred to be equal to a fixed value, for example 2.

Furthermore, the bit depth is of the blending weighting values are not limited to 3-bits. For example, 5-bit precision (i.e., value range is [0,32]) can be used to further improve the coding efficiency.

In some other examples, based on the generalized weighting value calculation equation $$\omega(m, n) = \text{Clip3}\left(0, 2^b, \text{round}\left(\frac{(d(m, n) + 16\theta)}{\theta 2^{(5-b)}}\right)\right),$$

different blending area width values (or blending strength) may be predefined both at the encoder and decoder side. For example, θ=0, θ=1, and θ=2 luma samples may be used.

In these examples, a CU level adaptation is performed. That is, at the decoder side, each CU (coding block) obtains a GPM blending width index from the bitstream that indicates which blending width value will be used for the current CU. At the encoder side, all possible blending width may be used to generate the GPM predictor, depending on the RD-cost, the best mode will be selected, and the corresponding index is signaled in the bitstream. Compared with the solution 1, the CU level blending width adaptation provides higher freedom to better adhere the moving object boundary using GPM. An example syntax element table is shown in Table 7. As shown in Table 7, gpm_blending_idx[x0][y0] indicates the GPM blending width index obtained by each CU from the bitstream.

TABLE 7

| merge_data( x0, y0, cbWidth, cbHeight, chType ) { | |
|---|---|
| ... | |
| if( !ciip_flag[ x0 ][ y0 ] ) { | |
| gpm_blending_idx[ x0 ][ y0 ] | ae(v) |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |

In some examples, gpm_blending_idx may be signaled using one or more context model depending on how many bins are signaled or other rules.

In addition, the high-level syntax gpm blending enabling flag may be combined with these examples. That is, a GPM blending enabling flag may be signaled in the picture header or slice header. When this flag is true, the GPM blending index is signaled at the CU level. Otherwise, when the GPM blending enabling flag is false, the GPM blending index is not signaled and is inferred to be equal to a default value, e.g., 2 luma samples. An example syntax table is shown in Table 8 and Table 9. As shown in Table 8, ph_gpm_adaptive_blending represents the GPM blending enabling flag signaled in the picture header, and gpm_blending_idx[x0][y0] represents the GPM blending index.

TABLE 8

| | Descriptor |
|---|---|
| picture_header_structure( ) { | |
| ... | |
| ph_gpm_adaptive_blending | u(1) |
| ... | |

TABLE 9

| merge_data( x0, y0, cbWidth, cbHeight, chType ) { | |
|---|---|
| ... | |
| if( !ciip_flag[ x0 ][ y0 ] ) { | |
| if (ph_gpm_adaptive_blending) | |
| gpm_blending_idx[ x0 ][ y0 ] | ae(v) |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |

Furthermore, the bit depth is of the blending weighting values are not limited to 3-bits. For example, 5-bit precision (i.e., value range is [0,32]) may be used to further improve the coding efficiency.

In some examples, based on the generalized weighting value calculation equation $$\omega(m, n) = \text{Clip3}\left(0, 2^b, \text{round}\left(\frac{(d(m, n) + 16\theta)}{\theta 2^{(5-b)}}\right)\right)$$

different blending area width values (or blending strength) may predefine both at the encoder and decoder side. For example, θ=0, θ=1, and θ=2 luma samples will be used.

In these examples, the blending width may be adaptively selected at the CU level. However, a template-matching method may be used to decide which blending is used both at the encoder and the decoder side.

That is, at the decoder side, the gpm partitioning mode (split mode) and merge indices may be first parsed from the bitstream and the motion information may be reconstructed.

A template for the current block may constructed using the already reconstructed samples in the current picture, i.e., samples from top or left of the current block. Assuming the template size is N, W×N samples for top template and N×H samples for left template are needed in one example.

Depending on the reconstructed motion information, two templates for two predictors of GPM may also be generated. These templates may have the same size with the template for the current block. These templates may be generated using interpolation from the reference picture, where the interpolation may be same or different from that used in generating the two GPM predictor.

In some examples, two templates for two predictors may be blended together to generate several blended templates using several predefined blending width values, e.g., θ=0, θ=1, and θ=2 luma samples. The blending matrices of these template may be generated using the already parsed partitioning mode and using the same method that is used to generate the blending matrices of GPM predictor.

The distortion cost between the blended templates and the template for current block may be computed. In one example, the cost computation is SAD. The corresponding blending width with lowest template distortion cost may be considered as the best blending width for the current block. Finally, blending matrices of the GPM predictor for the current block may be generated using this blending width.

At the encoder side, the template matching process is same as in the decoder for all possible candidates. That is, a template for current block, and two templates for predictors are generated. The two templates for predictors are blended together using several pre-defined blending width values. The distortion cost values between the blended templates and the template for current block are computed. The corresponding blending width with lowest cost is used for the blending mask generation of the current tested candidate.

In addition, the high-level syntax gpm blending enabling flag in solution 1 may be combined with these examples. For example, a GPM blending enabling flag may be signaled in the picture header or slice header. When this flag is true, the gpm blending width value is derived both at the encoder and decoder side based on the described template matching method. Otherwise, when this flag is false, a default blending width value, e.g., $\theta=2$ luma samples is used in the blending matrices generation.

Furthermore, the bit depth is of the blending weighting values are not limited to 3-bits. For example, 5-bit precision (i.e., value range is [0, 32]) may be used to further improve the coding efficiency.

In some examples, based on the generalized weighting value calculation equation $$\omega(m, n) = \text{Clip3}\left(0, 2^{b}, \text{round}\left(\frac{(d(m, n) + 16\theta)}{\theta 2^{(5-b)}}\right)\right),$$

different blending area width values (or blending strength) may be predefined both at the encoder and decoder side. For example, $\theta=0$, $\theta=1$, and $\theta=2$ luma samples will be used.

Similar to some examples above, template matching method may be used to order the blending width list. In the meantime, the blending width value index may be also signaled similar to some examples above.

At the decoder side, the gpm partitioning mode (split mode) and merge indices may be first parsed from the bitstream and the motion information may be reconstructed. In the meantime, a gpm blending index syntax element may be also parse from the bitstream, the largest possible value of the GPM blending index may be equal to or smaller than the number of predefined blending width values minus one.

A template for the current block may be constructed using the already reconstructed samples in the current picture, i.e., samples from top or left of the current block. Assuming the template size is N, W×N samples for top template and N×H samples for left template are needed in one example.

Depending on the reconstructed motion information, two templates for two predictors of GPM may be also generated. These templates may have the same size with the template for the current block. These templates may be generated using interpolation from the reference picture, where the interpolation may be same or different from that used in generating the two GPM predictors.

Two templates for two predictors need to be blended together to generate several blended templates using several predefined blending width values, e.g., $\theta=0$, $\theta=1$, and $\theta=2$ luma samples. The blending matrices of these templates may be generated using the already parsed partitioning mode and using the same method that is used to generate the blending matrices of GPM predictor.

In some examples, the distortion cost between the blended templates and the template for the current block may be computed. One example method for cost computation is SAD. The corresponding blending width values are sorted based on the ascending order of the template cost. For example, the blending width value with smallest template cost will be place in the first position in the list; the blending width value with largest template cost will be place in the last position in the list. Depending on the parsed blending width value index, the final used blending width can be obtained. For example, when the parsed blending width index is equal to 0, the first blending width value in the reordered blending width values list is used.

In some examples, the largest possible value of the GPM blending index may be equal to or smaller than the number of predefined blending width values minus one. And the blending index may be signaled using one or more context models. When the largest possible value of the GPM blending index is equal to the number of predefined blending width values minus one, the template matching-based blending reordering for blending width values is beneficial for the context-based binary arithmetic coding, which will introduce additional coding gain. When that the largest possible value of the gpm blending index is smaller to the number of predefined blending width values minus one, the signaling overhead (signaling cost) for GPM blending index is smaller, which will also lead to additional coding gain.

In addition, the high-level syntax gpm blending enabling flag may also be combined with these examples. For example, a GPM blending enabling flag may be signaled in the picture header or slice header. When this flag is true, the GPM blending width value is derived both at the encoder and decoder side based on the described template matching method and the additional signaled gpm blending index. Otherwise, when this flag is false, a default blending width value, e.g., $\theta=2$ luma samples, may be used in the blending matrices generation without additional signaled GPM blending index.

Furthermore, the bit depth is of the blending weighting values may be not limited to 3-bits. For example, 5-bit precision (i.e., value range is [0, 32]) may be used to further improve the coding efficiency.

FIG. 13 shows a computing environment (or a computing device) 1310 coupled with a user interface 1360. The computing environment 1310 can be part of a data processing server. In some embodiments, the computing device 1310 can perform any of various methods or processes (such as encoding/decoding methods or processes) as described hereinbefore in accordance with various examples of the present disclosure. The computing environment 1310 may include a processor 1320, a memory 1340, and an I/O interface 1350.

The processor 1320 typically controls overall operations of the computing environment 1310, such as the operations associated with the display, data acquisition, data communications, and image processing. The processor 1320 may include one or more processors to execute instructions to perform all or some of the steps in the above-described methods. Moreover, the processor 1320 may include one or more modules that facilitate the interaction between the processor 1320 and other components. The processor may be a Central Processing Unit (CPU), a microprocessor, a single chip machine, a GPU, or the like.

The memory 1340 is configured to store various types of data to support the operation of the computing environment 1310. Memory 1340 may include predetermine software 1342. Examples of such data include instructions for any applications or methods operated on the computing environment 1310, video datasets, image data, etc. The memory 1340 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1350 provides an interface between the processor 1320 and peripheral interface modules, such as a keyboard, a click wheel, buttons, and the like. The buttons may include but are not limited to, a home button, a start scan button, and a stop scan button. The I/O interface 1350 can be coupled with an encoder and decoder.

In some embodiments, there is also provided a non-transitory computer-readable storage medium including a plurality of programs, such as included in the memory 1340, executable by the processor 1320 in the computing environment 1310, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1310 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

FIG. 17 is a flowchart illustrating a method for video decoding according to an example of the present disclosure.

In step 1701, the processor 1320, at the decoder side, may obtain a GPM blending area index at a certain level associated with a picture, where the GPM blending area index indicates a blending area width from a set of blending area widths.

In some examples, the certain level may be the picture level, the slice level, the CU level, etc. Thus, the GPM blending area index may be singled in picture header when the index is at the picture level, and the GPM blending area index may be singled in slice header when the index is at the slice level.

In some examples, the GPM blending area index may be the blending width index ph_gpm_blending_idx in Table 5 or Table 6. The bending area width may be indicated by the blending width θ as shown in FIG. 16.

In some examples, the processor 1320 may obtain the GPM blending area index that is signaled at a CU level, where the GPM blending area index indicates the blending area width applied for a current CU.

In some examples, the processor 1320 may obtain the GPM blending area index that is signaled at a first level that is higher than a CU level, where the first level includes a picture level or a slice level. Furthermore, the processor 1320 may determine that the blending area width is applied for the picture in response to determining that the GPM blending area index is signaled at the picture level, and the processor 1320 may determine that the blending area width is applied for a slice in response to determining that the GPM blending area index is signaled at the picture level.

In some examples, the processor 1320 may obtain a GPM adaptive blending syntax element that indicates whether adaptive blending is enabled at the certain level. Furthermore, the processor 1320 may determine that the GPM blending area index is signaled in response to determining that the GPM adaptive blending syntax element is enabled and determine that the GPM blending area index is not signaled in response to determining that the GPM adaptive blending syntax element is disabled.

In some examples, the set of blending area widths may include a plurality of pre-defined values.

In some examples, the plurality of pre-defined values may include blending area widths of half, one, two, four and eight samples on each side of GPM partition. In some examples, the blending area widths are of half, one, two, four and eight luma samples on each side of GPM partition, as shown in FIG. 16.

In some examples, the processor 1320 may infer that a value of the GPM blending area index is a fixed value in response to determining that the GPM blending area index is not present.

In some examples, the fixed value may be equal to a blending area width of two samples on each side of GPM partition.

In step 1702, the processor 1320 may obtain one or more weighting values that are used to blend prediction samples of a GPM mode based on the blending area width indicated by the GPM blending area index.

In some examples, the processor 1320 may obtain the one or more weighting values in an increased bit depth. For example, the bit depth is of the blending weighting values are not limited to 3-bits and 5-bit precision (i.e., value range is [0,32]) can be used to further improve the coding efficiency.

In step 1703, the processor 1320 may obtain a GPM predictor based on the one or more weighting values.

FIG. 18 is a flowchart illustrating a method for video encoding corresponding the method for video decoding as shown in FIG. 17.

In step 1801, the processor 1320, at the encoder side, may signal a GPM blending area index at a certain level associated with a picture, where the GPM blending area index indicates a blending area width from a set of blending area widths.

In some examples, the certain level may be the picture level, the slice level, the CU level, etc. Thus, the GPM blending area index may be singled in picture header when the index is at the picture level, and the GPM blending area index may be singled in slice header when the index is at the slice level.

In some examples, the GPM blending area index may be the blending width index ph_gpm_blending_idx in Table 5 or Table 6. The bending area width may be indicated by the blending width θ as shown in FIG. 16.

In some examples, the processor 1320 may signal the GPM blending area index at a CU level, where the GPM blending area index indicates the blending area width applied for a current CU.

In some examples, the processor 1320 may signal the GPM blending area index at a first level that is higher than a CU level, where the first level includes a picture level or a slice level. Furthermore, the processor 1320 may determine that the blending area width is applied for the picture in response to determining that the GPM blending area index is signaled at the picture level, and the processor 1320 may determine that the blending area width is applied for a slice in response to determining that the GPM blending area index is signaled at the picture level.

In some examples, the processor 1320 may signal a GPM adaptive blending syntax element that indicates whether adaptive blending is enabled at the certain level. Furthermore, the processor 1320 may determine that the GPM blending area index is signaled in response to determining that the GPM adaptive blending syntax element is enabled and determine that the GPM blending area index is not signaled in response to determining that the GPM adaptive blending syntax element is disabled.

In some examples, the set of blending area widths may include a plurality of pre-defined values.

In some examples, the plurality of pre-defined values may include blending area widths of half, one, two, four and eight samples on each side of GPM partition. In some examples, the blending area widths are of half, one, two, four and eight luma samples on each side of GPM partition, as shown in FIG. 16.

In some examples, the processor 1320 may obtain the one or more weighting values in an increased bit depth. For example, the bit depth is of the blending weighting values are not limited to 3-bits and 5-bit precision (i.e., value range is [0,32]) can be used to further improve the coding efficiency.

In some examples, the processor 1320 may infer that a value of the GPM blending area index is a fixed value in response to determining that the GPM blending area index is not present.

In some examples, the fixed value may be equal to a blending area width of two samples on each side of GPM partition.

In step 1802, the processor 1320 may obtain one or more weighting values that are used to blend prediction samples of a GPM mode based on the blending area width indicated by the GPM blending area index.

In step 1803, the processor 1320 may obtain a GPM predictor based on the one or more weighting values.

FIG. 19 is a flowchart illustrating a method for video decoding according to an example of the present disclosure.

In step 1901, the processor 1320, at the decoder side, may obtain a plurality of first prediction samples of neighboring reconstructed samples of a CU based on a motion vector associated with a first GPM part of the CU and a plurality of second prediction samples of the neighboring reconstructed samples of the CU based on a motion vector associated with the second GPM part of the CU.

In step 1902, the processor 1320 may obtain a plurality of blended prediction samples of the neighboring reconstructed samples based on the first prediction samples, the second prediction samples, and a plurality of blending area widths.

In some examples, the plurality of blending area widths may include a plurality of pre-defined values.

In step 1903, the processor 1320 may reorder the plurality of blending area widths based on distortion costs between the plurality of blended prediction samples associated with each blending area width and reconstructed neighboring samples of the current CU to obtain a reordered list of blending area widths.

In some examples, the plurality of blending area widths may be reordered based on an ascending order of the distortion costs In step 1904, the processor 1320 may obtain a GPM blending area index and then obtain a blending area width based on the GPM blending area index and the reordered list of blending area widths.

In step 1905, the processor 1320 may obtain one or more weighting values that are used to blend the first and second prediction samples of a GPM mode based on the blending area width.

In some examples, the processor 1320 may obtain the one or more weighting values in an increased bit depth.

In step 1905, the processor 1320 may obtain a GPM predictor based on the one or more weighting values.

In some examples, the processor 1320 may obtain a GPM adaptive blending syntax element that indicates whether adaptive blending is enabled at a certain level. Furthermore, the processor 1320 may perform the reordering of the plurality of blended prediction samples in response to determining that the GPM adaptive blending syntax element is enabled and infer that the blending area width is a fixed value.

In some examples, the processor 1320 may determine that the blending area width is associated with the lowest distortion cost in response to determining that the GPM blending area index is equal to 0.

FIG. 20 is a flow chart illustrating a method for video encoding corresponding to the method for video decoding as shown in FIG. 19 in accordance with some examples of the present disclosure.

In step 2001, the processor 1320, at the encoder side, may obtain a plurality of first prediction samples of neighboring reconstructed samples of a CU based on a motion vector associated with a first GPM part of the CU and a plurality of second prediction samples of the neighboring reconstructed samples of the CU based on a motion vector associated with the second GPM part of the CU.

In step 2002, the processor 1320 may obtain a plurality of blended prediction samples of the neighboring reconstructed samples based on the first prediction samples, the second prediction samples, and a plurality of blending area widths.

In some examples, the plurality of blending area widths may include a plurality of pre-defined values.

In step 2003, the processor 1320 may reorder the plurality of blending area widths based on distortion costs between the plurality of blended prediction samples associated with each blending area width and reconstructed neighboring samples of the current CU to obtain a reordered list of blending area widths.

In some examples, the plurality of blending area widths may be reordered based on an ascending order of the distortion costs In step 2004, the processor 1320 may obtain a GPM blending area index and obtaining, by the decoder, a blending area width based on the GPM blending area index and the reordered list of blending area widths.

In step 2005, the processor 1320 may obtain one or more weighting values that are used to blend the first and second prediction samples of a GPM mode based on the blending area width.

In some examples, the processor 1320 may obtain the one or more weighting values in an increased bit depth.

In step 2005, the processor 1320 may obtain a GPM predictor based on the one or more weighting values.

In some examples, the processor 1320 may obtain a GPM adaptive blending syntax element that indicates whether adaptive blending is enabled at a certain level. Furthermore, the processor 1320 may perform the reordering of the plurality of blended prediction samples in response to determining that the GPM adaptive blending syntax element is enabled and infer that the blending area width is a fixed value.

In some examples, the processor 1320 may determine that the blending area width is associated with the lowest distortion cost in response to determining that the GPM blending area index is equal to 0.

In some examples, there is provided an apparatus for video decoding. The apparatus includes a processor 1320 and a memory 1340 configured to store instructions executable by the processor; where the processor, upon execution of the instructions, is configured to perform any method as illustrated in FIG. 17 or 19.

In some examples, there is provided an apparatus for video encoding. The apparatus includes a processor 1320 and a memory 1340 configured to store instructions executable by the processor; where the processor, upon execution of the instructions, is configured to perform any method as illustrated in FIG. 18 or 20.

In some other examples, there is provided a non-transitory computer readable storage medium, having instructions stored therein. When the instructions are executed by a processor 1320, the instructions cause the processor to perform any method as illustrated in FIGS. 17-20. In one example, the plurality of programs may be executed by the processor 1320 in the computing environment 1310 to receive (for example, from the video encoder 20 in FIG. 1G) a bitstream or data stream including encoded video information (for example, video blocks representing encoded video frames, and/or associated one or more syntax elements, etc.), and may also be executed by the processor 1320 in the computing environment 1310 to perform the decoding method described above according to the received bitstream or data stream. In another example, the plurality of programs may be executed by the processor 1320 in the computing environment 1310 to perform the encoding method described above to encode video information (for example, video blocks representing video frames, and/or associated one or more syntax elements, etc.) into a bitstream or data stream, and may also be executed by the processor 1320 in the computing environment 1310 to transmit the bitstream or data stream (for example, to the video decoder 30 in FIG. 2B). Alternatively, the non-transitory computer-readable storage medium may have stored therein a bitstream or a data stream including encoded video information (for example, video blocks representing encoded video frames, and/or associated one or more syntax elements etc.) generated by an encoder (for example, the video encoder 20 in FIG. 1G) using, for example, the encoding method described above for use by a decoder (for example, the video decoder 30 in FIG. 2B) in decoding video data by operations included in the decoding method described above. The non-transitory computer-readable storage medium may be, for example, a ROM, a Random Access Memory (RAM), a CD-ROM, a magnetic tape, a floppy disc, an optical data storage device or the like.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for video decoding, comprising:
obtaining, by a decoder, a geometric partition mode (GPM) blending area index at a certain level associated with a picture, wherein the GPM blending area index indicates a blending area width from a set of blending area widths, wherein the blending area width indicates a width of a blending area which is defined by a number of samples on each side of a GPM partition;
obtaining, by the decoder and based on the blending area width indicated by the GPM blending area index, one or more weighting values that are used to blend prediction samples of a GPM mode; and
obtaining, by the decoder and based on the one or more weighting values, a GPM predictor.

2. The method of claim 1, further comprising:
obtaining, by the decoder, the GPM blending area index that is signaled at a coding unit (CU) level, wherein the GPM blending area index indicates the blending area width applied for a current CU.

3. The method of claim 1, further comprising:
obtaining, by the decoder, the GPM blending area index that is received at a first level that is higher than a coding unit (CU) level, wherein the first level comprises a picture level or a slice level;
in response to determining that the GPM blending area index is received at the picture level, determining that the blending area width is applied for the picture; and
in response to determining that the GPM blending area index is received at the slice level, determining that the blending area width is applied for a slice.

4. The method of claim 1, further comprising:
obtaining, by the decoder, a GPM adaptive blending syntax element that indicates whether adaptive blending is enabled at the certain level;
in response to determining that the GPM adaptive blending syntax element is enabled, determining that the GPM blending area index is received; and
in response to determining that the GPM adaptive blending syntax element is disabled, determining that the GPM blending area index is not received.

5. The method of claim 1, wherein the set of blending area widths comprises a plurality of pre-defined values.

6. The method of claim 5, wherein the plurality of pre-defined values comprise blending area widths of half, one, two, four, and eight samples on each side of a GPM partition.

7. The method of claim 1, further comprising:
obtaining, by the decoder, the one or more weighting values in an increased bit depth.

8. The method of claim 1, further comprising:
in response to determining that the GPM blending area index is not present, inferring, by the decoder, that a value of the GPM blending area index is a fixed value.

9. The method of claim 8, wherein the fixed value is equal to a blending area width of two samples on each side of a GPM partition.

10. An apparatus for video decoding, comprising:
one or more processors; and
a memory coupled to the one or more processors and configured to store instructions executable by the one or more processors,
wherein the one or more processors, upon execution of the instructions, are configured to perform operations comprising:
obtaining a geometric partition mode (GPM) blending area index at a certain level associated with a picture, wherein the GPM blending area index indicates a blending area width from a set of blending area widths, wherein the blending area width indicates a width of a blending area which is defined by a number of samples on each side of a GPM partition;

obtaining, based on the blending area width indicated by the GPM blending area index, one or more weighting values that are used to blend prediction samples of a GPM mode; and obtaining, based on the one or more weighting values, a GPM predictor.

11. The apparatus of claim 10, wherein the operations further comprise:

obtaining the GPM blending area index that is received at a coding unit (CU) level, wherein the GPM blending area index indicates the blending area width applied for a current CU.

12. The apparatus of claim 10, wherein the operations further comprise:

obtaining the GPM blending area index that is received at a first level that is higher than a coding unit (CU) level, wherein the first level comprises a picture level or a slice level;

in response to determining that the GPM blending area index is received at the picture level, determining that the blending area width is applied for the picture; and in response to determining that the GPM blending area index is received at the slice level, determining that the blending area width is applied for a slice.

13. The apparatus of claim 10, wherein the operations further comprise:

obtaining a GPM adaptive blending syntax element that indicates whether adaptive blending is enabled at the certain level;

in response to determining that the GPM adaptive blending syntax element is enabled, determining that the GPM blending area index is received; and in response to determining that the GPM adaptive blending syntax element is disabled, determining that the GPM blending area index is not received.

14. The apparatus of claim 10, wherein the set of blending area widths comprises a plurality of pre-defined values.

15. The apparatus of claim 14, wherein the plurality of pre-defined values comprise blending area widths of half, one, two, four, and eight samples on each side of a GPM partition.

16. The apparatus of claim 10, wherein the operations comprise:

obtaining the one or more weighting values in an increased bit depth.

17. The apparatus of claim 10, wherein the operations further comprise:

in response to determining that the GPM blending area index is not present, inferring that a value of the GPM blending area index is a fixed value.

18. The apparatus of claim 17, wherein the fixed value is equal to a blending area width of two samples on each side of a GPM partition.

19. A method for transmitting a bitstream to be decoded by operations comprising:

obtaining, by a decoder, a geometric partition mode (GPM) blending area index at a certain level associated with a picture, wherein the GPM blending area index indicates a blending area width from a set of blending area widths, wherein the blending area width indicates a width of a blending area which is defined by a number of samples on each side of a GPM partition;

obtaining, by the decoder and based on the blending area width indicated by the GPM blending area index, one or more weighting values that are used to blend prediction samples of a GPM mode; and obtaining, by the decoder and based on the one or more weighting values, a GPM predictor.

20. The method of claim 19, wherein the operations further comprise:

obtaining, by the decoder, the GPM blending area index that is received at a coding unit (CU) level, wherein the GPM blending area index indicates the blending area width applied for a current CU.

* * * * *